(12) United States Patent
Iwakoshi et al.

(10) Patent No.: US 9,798,282 B2
(45) Date of Patent: Oct. 24, 2017

(54) BELT CONVEYOR UNIT AND IMAGE FORMING APPARATUS

(71) Applicant: CANON KABUSHIKI KAISHA, Tokyo (JP)

(72) Inventors: Tomoyuki Iwakoshi, Suntou-gun (JP); Atsushi Ogata, Mishima (JP); Daisuke Kaneko, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/179,828

(22) Filed: Jun. 10, 2016

(65) Prior Publication Data
US 2016/0282790 A1    Sep. 29, 2016

Related U.S. Application Data

(63) Continuation of application No. 14/274,871, filed on May 12, 2014, now Pat. No. 9,400,456.

(30) Foreign Application Priority Data

May 14, 2013 (JP) ................................. 2013-102397
Dec. 11, 2013 (JP) ................................. 2013-256385

(51) Int. Cl.
| B65G 39/16 | (2006.01) |
| B65G 15/64 | (2006.01) |
| G03G 15/00 | (2006.01) |
| G03G 15/16 | (2006.01) |
| B65H 5/02 | (2006.01) |

(52) U.S. Cl.
CPC ......... *G03G 15/6529* (2013.01); *B65G 39/16* (2013.01); *B65H 5/021* (2013.01); *G03G 15/1615* (2013.01); *B65H 2404/211* (2013.01); *B65H 2404/255* (2013.01); *G03G 2215/00156* (2013.01); *G03G 2215/00168* (2013.01)

(58) Field of Classification Search
CPC .... B65G 39/16; B65G 15/64; G03G 15/1615; G03G 2215/00156; G03G 2215/00168
USPC ..................................... 198/806, 807, 810.03
See application file for complete search history.

(56) References Cited

U.S. PATENT DOCUMENTS

| 4,286,706 A * | 9/1981 | Castelli ................ G03G 15/755 198/806 |
| 7,058,345 B2 * | 6/2006 | Abe ........................ B65G 23/44 198/806 |
| 7,111,724 B2 * | 9/2006 | Donnenhoffer ........ B65G 39/16 198/807 |

(Continued)

FOREIGN PATENT DOCUMENTS

| JP | H07-304536 A | 11/1995 |
| JP | 2001-125390 A | 5/2001 |

(Continued)

*Primary Examiner* — James R Bidwell
(74) *Attorney, Agent, or Firm* — Canon U.S.A. Inc., IP Division

(57) ABSTRACT

An inclined flange roller is located outward of an end portion of a tension roller in the belt width direction. The inclined flange roller includes a flange surface capable of being in contact with the edge portion of a belt in a region in which the belt is wound around the tension roller and a roller surface capable of being in contact with an inner peripheral surface of the belt between the flange surface and an end portion of the tension roller in the belt width direction.

21 Claims, 24 Drawing Sheets

(56) References Cited

U.S. PATENT DOCUMENTS

| | | | | |
|---|---|---|---|---|
| 7,434,680 | B2* | 10/2008 | Kitamura | B65G 15/60 198/806 |
| 7,921,987 | B2* | 4/2011 | Kitamura | B41J 11/007 198/806 |
| 8,657,104 | B2* | 2/2014 | Asaoka | B65G 15/64 198/806 |
| 2013/0306440 | A1* | 11/2013 | Asaoka | B65G 15/64 198/806 |
| 2013/0306441 | A1* | 11/2013 | Asaoka | B65G 15/64 198/806 |
| 2014/0083821 | A1* | 3/2014 | Hozumi | G03G 15/1615 198/806 |
| 2015/0314976 | A1* | 11/2015 | Hozumi | G03G 15/1615 198/806 |

FOREIGN PATENT DOCUMENTS

| | | |
|---|---|---|
| JP | 2010-230958 A | 10/2010 |
| JP | 2011-107340 A | 6/2011 |
| JP | 2012-254867 A | 12/2012 |
| JP | 2013-080098 A | 5/2013 |
| JP | 2013-083693 A | 5/2013 |

\* cited by examiner

BELT CONVEYOR UNIT AND IMAGE FORMING APPARATUS

CROSS-REFERENCE TO RELATED APPLICATIONS

This application is a continuation of U.S. patent application Ser. No. 14/274,871 filed May 12, 2014, which issued as U.S. Pat. No. 9,400,456 on Jul. 26, 2016, which claims the benefit of Japanese Patent Application No. 2013-102397 filed May 14, 2013 and No. 2013-256385 filed Dec. 11, 2013, all of which are hereby incorporated by reference herein in their entirety.

BACKGROUND OF THE INVENTION

Field of the Invention

The present invention relates to a belt conveyor unit having an endless belt that is stretched by a plurality of stretching rollers and is moved around the stretching rollers and an electrophotographic image forming apparatus, such as a printer or a copying machine, including the belt conveyor unit.

Description of the Related Art

Some existing electrophotographic printers and copying machines include a belt conveyor unit having an endless belt that is stretched by a plurality of stretching rollers and is moved around the stretching rollers. Such a belt conveyor unit has the following disadvantage. That is, when a belt moves, the belt may be shifted to one side in the width direction (i.e., a direction substantially perpendicular to the belt moving direction).

To solve such a problem, Japanese Patent Laid-Open No. 2005-31504 describes a structure in which a belt has an inner peripheral surface having a rib thereon as a protruding portion and each of stretching rollers has a flange at the end. According to Japanese Patent Laid-Open No. 2005-31504, if the belt is shifted, the flange is brought into contact with the rib to regulates the position of the rib so that the lateral shift of the belt can be regulated.

The drawback of the structure described in Japanese Patent Laid-Open No. 2005-31504 is that it requires the rib that prevents the lateral shift of the belt and, if the rib is bonded to the inner peripheral surface of the belt, it requires a rib bonding step when producing the belt. In the case where a rib is not provided, an edge portion of the belt in the width direction can be in direct contact with the flange. However, in such a case, there is a risk of cracking of the belt from the edge of the belt. Thus, the durability may be decreased.

SUMMARY OF THE INVENTION

Accordingly, the present invention provides a belt conveyor unit that prevents the lateral shift of the belt while preventing a decrease in the durability of the belt edge portion with a simplified structure and an image forming apparatus including the belt conveyor unit.

According to an embodiment of the present invention, a belt conveyor unit includes a movable endless belt, a stretching roller configured to stretch the belt, and a regulation member configured to regulate lateral shift of the belt in a case the belt is shifted to one side in a belt width direction that is perpendicular to a belt moving direction. The regulation member is disposed outward of an end portion of the stretching roller in the belt width direction, and the regulation member includes a first regulation portion capable of being in contact with the edge portion of the belt in a region in which the belt is wound around the stretching roller and a second regulation portion capable of being in contact with an inner peripheral surface of the belt between the first regulation portion and an end portion of the stretching roller in the belt width direction.

According to another embodiment of the present invention, a belt conveyor unit includes a movable endless belt, a pressing member, a tension roller that presses the belt in a direction from the inner peripheral surface to an outer peripheral surface of the belt, a roller that stretches the belt, and a regulation member configured to regulate lateral shift of the belt if the belt is shifted to one side in a belt width direction that is perpendicular to a belt moving direction. The regulation member is disposed outward of an end portion of the tension roller in the belt width direction, and the regulation member includes a regulation portion capable of being in contact with the edge portion of the belt in a region in which the belt is wound around the stretching roller. If the belt is laterally shifted to one side in the belt width direction, the edge portion of the belt is brought into contact with the regulation portion without inclination of a rotation shaft of the tension roller with respect to the rotation shaft of the roller so as to regulate the lateral shift of the belt.

Further features of the present invention will become apparent from the following description of exemplary embodiments with reference to the attached drawings.

DESCRIPTION OF THE EMBODIMENTS

Exemplary embodiments of the present invention are described in detail below with reference to the accompanying drawings. Note that the dimensions, materials, shapes, and relative positions of components described in the following exemplary embodiments are to be appropriately changed in accordance with the structure and various conditions of an apparatus of the present invention. That is, the scope of the invention is not limited thereto, unless expressly specified otherwise.

First Exemplary Embodiment

Architecture of Image Forming Apparatus

Figure 1:
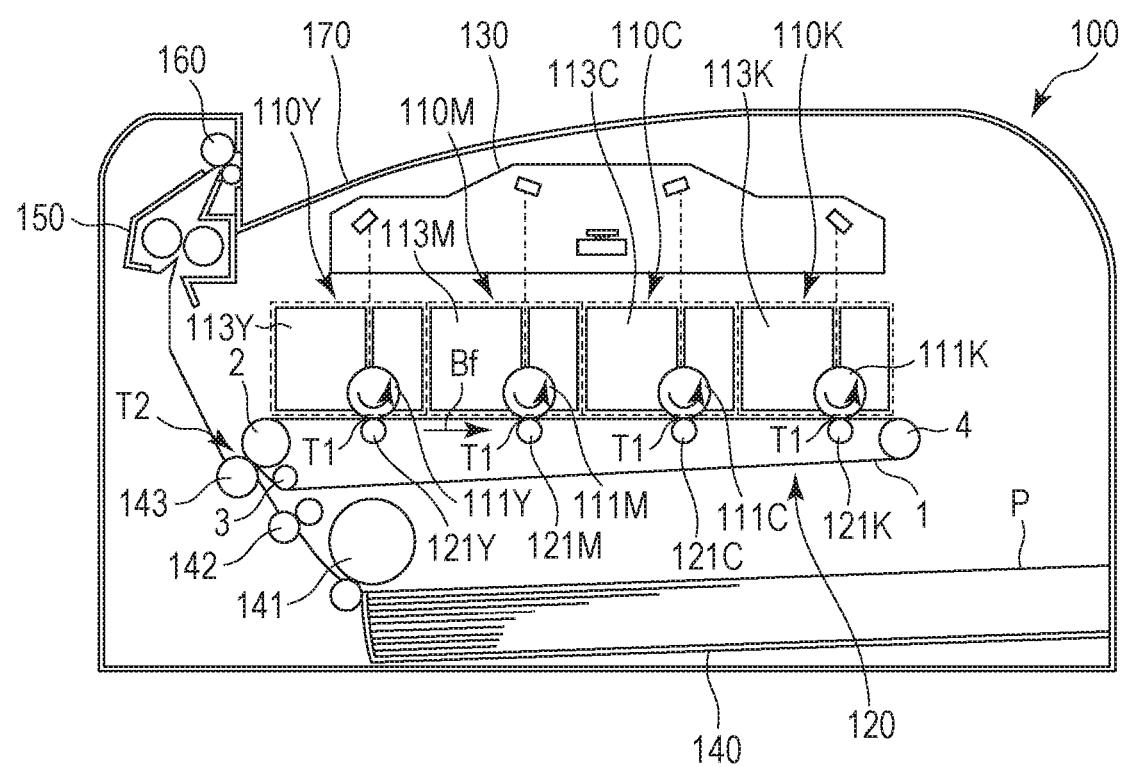
FIG. 1 is a schematic illustration of a color image forming apparatus including a belt conveyor unit according to an embodiment of the present invention.

FIG. 1 is a schematic illustration of an example of a color image forming apparatus. The configuration of the image forming apparatus according to the present exemplary embodiment is described below with reference to FIG. 1. An image forming apparatus 100 can electrophotographically form an image on a transfer material P, such as a recording sheet or an OHP sheet, in accordance with a signal transmitted from an external device, such as a personal computer, connected thereto.

In the image forming apparatus 100, a plurality of image forming units 110Y, 110M, 110C, and 110K that form yellow, magenta, cyan, and black toner images, respectively, are arranged in a line in a substantially horizontal direction. In addition, a transfer unit that serves as a belt conveyor unit is disposed so as to face the image forming units 110Y, 110M, 110C, and 110K.

According to the present exemplary embodiment, the transfer unit is formed as an intermediate transfer unit 120. The intermediate transfer unit 120 revolvably moves an endless belt 1 (an intermediate transfer belt) that serves as an intermediate transfer member so that the image forming units 110Y, 110M, 110C, and 110K face the intermediate transfer belt 1. The image forming units 110Y, 110M, 110C, and 110K have the same structure and operations except that the colors of formed toner images differ from one another. Hereinafter, suffixes "Y", "M", "C", and "K" of the reference numerals of the image forming units are removed, and the reference numeral represents any one of the image forming units in the case where the distinction is not needed. Thus, the common features are described.

The image forming unit 110 forms a toner image through a widely used electrophotographic image forming process. That is, the image forming unit 110 has a cylindrical electrophotographic photoconductor, that is, a photoconductive drum 111 mounted therein in a rotatable manner in a direction of the arrow in FIG. 1. The photoconductive drum 111 serves as an image bearing member. In an image forming operation, a charging device (not illustrated) charges a surface of the photoconductive drum 111 that is rotating first. Subsequently, a laser scanner 130 serving as an exposure device emits a light beam in accordance with a signal transmitted from a computer. Thus, the laser scanner 130 serving as an exposure device performs scanning exposure on the charged photoconductive drum 111 to form an electrostatic latent image. By supplying toner serving as a development agent from a developing device 113, the electrostatic latent image formed on the photoconductive drum 111 is visualized as a toner image. Thereafter, the toner image formed on the photoconductive drum 111 is electrostatically transferred onto the belt 1 in a primary transfer unit T1 by the operation performed by a primary transfer roller 121 serving as a primary transfer unit disposed so as to face the photoconductive drum 111 with the belt 1 therebetween.

Through the above-described process, the toner images formed on the photoconductive drums 111 of the image forming units 110Y, 110M, 110C, and 110K are transferred onto the belt 1 one on top of the other in synchronization with the movement of the belt 1. Thus, a color toner image is formed.

In addition, the transfer material P is fed from a transfer material container 140 by, for example, a pickup roller 141. Thereafter, the transfer material P is delivered to a contact portion (a secondary transfer unit) T2 formed between a secondary transfer roller 143 serving as a secondary transfer unit and the belt 1 in synchronization with the operation performed by a registration roller 142. In this manner, the toner image on the belt 1 is electrostatically transferred onto the transfer material P through the operation performed by the secondary transfer roller 143 in the secondary transfer unit T2. Subsequently, the transfer material P is separated from the belt 1 and is conveyed to a fixing unit 150, where the toner image on the transfer material P is pressed and heated. Thus, the toner image is firmly fixed onto the transfer material P. Subsequently, the transfer material P is conveyed by a discharge roller 160 and is ejected onto an ejecting tray 170.

According to the present exemplary embodiment, the intermediate transfer unit 120 serving as the transfer unit is removable from the image forming apparatus 100. That is, the belt conveyor unit is removable from the image forming apparatus. Alternatively, the photoconductive drum 111 and the developing device 113 of each of the image forming units 110 may be integrated with each other into a cartridge using a frame body. In this manner, the photoconductive drum 111 and the developing device 113 may be in the form of a process cartridge that is removable from the image forming apparatus 100.

Intermediate Transfer Unit

Figure 2:
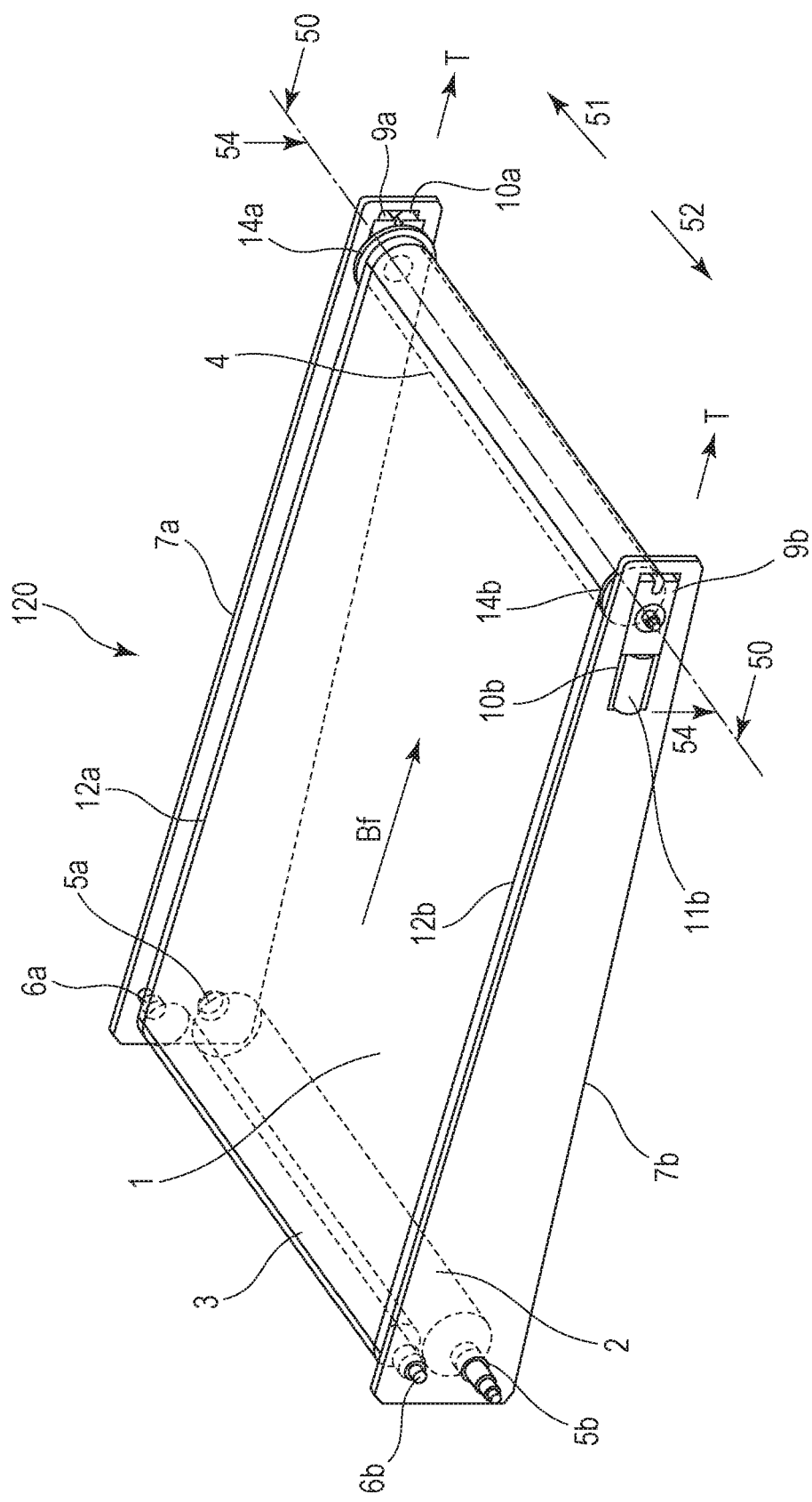
FIG. 2 is a perspective view of an intermediate transfer unit according to a first exemplary embodiment.
Figure 3:
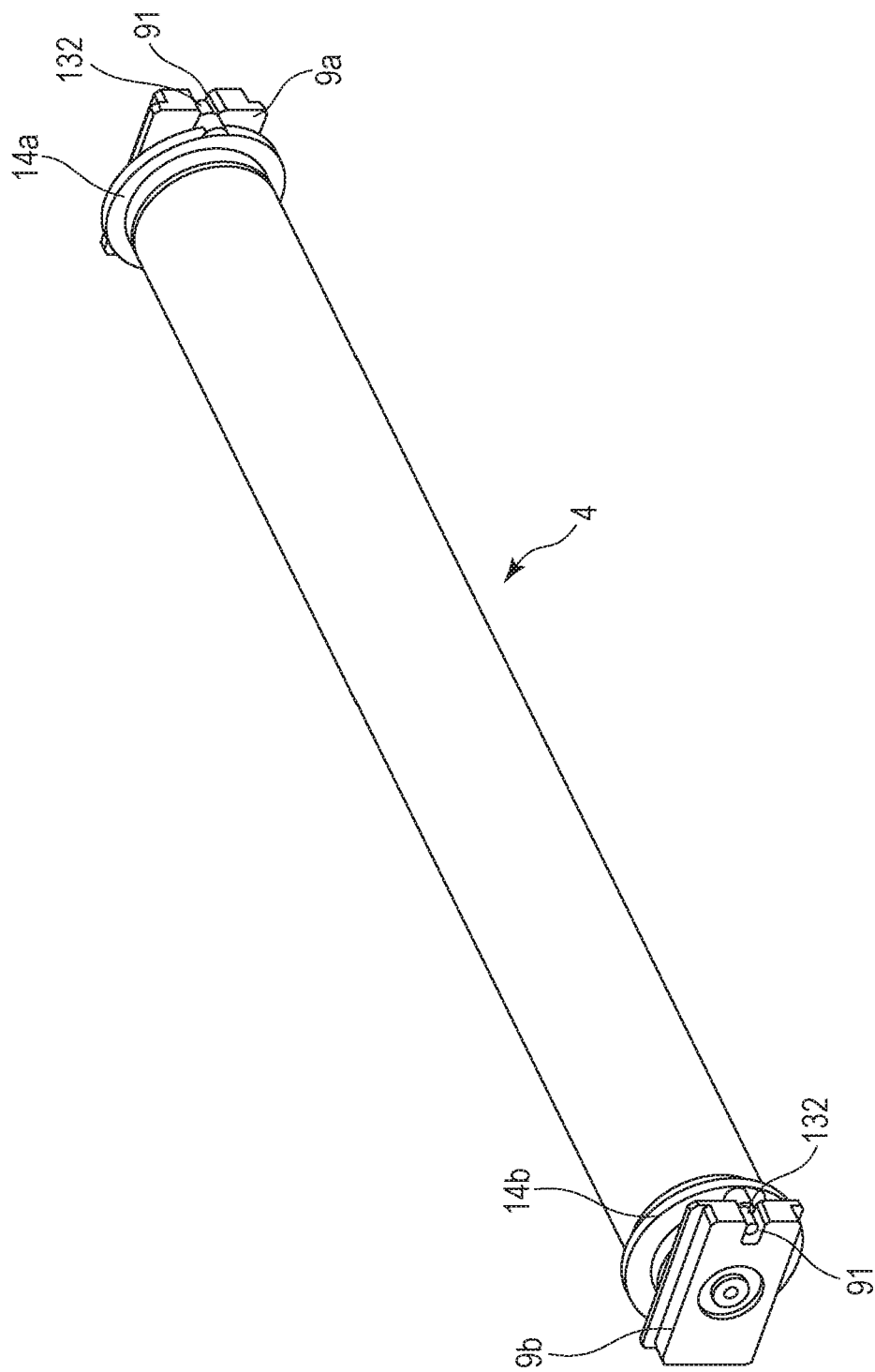
FIG. 3 is a perspective view of a tension roller according to the first exemplary embodiment.

The structure of the intermediate transfer unit 120 is described below with reference to FIGS. 2 and 3. FIG. 2 is an external perspective view of the intermediate transfer unit 120 according to the present exemplary embodiment. FIG. 3 is a perspective view of a tension roller 4.

The intermediate transfer unit 120 includes the endless belt 1 and a plurality of stretching rollers for keeping the belt 1 under tension. The stretching rollers are a drive roller 2 for driving the belt 1, a driven roller 3 that is in contact with the belt 1 which is moving and revolving around the stretching rollers and that is driven to rotate, and the tension roller 4.

Both ends of the drive roller 2 and the driven roller 3 in the belt width direction are rotatably supported by bearings 5 (5a, 5b) and bearings 6 (6a, 6b), respectively. As used herein, the term "belt width direction" refers to a direction substantially perpendicular to the moving direction of the belt 1. The bearings 5a and 6a that support the two rollers are supported by a first side plate 7a, and the bearings 5b and 6b that also support the two rollers are supported by a second side plate 7b. Upon receiving a driving force transferred from a drive source (not illustrated) disposed in the image forming apparatus 100, the drive roller 2 rotates. When the drive roller 2 rotates, the belt 1 stretched by the drive roller 2 is moved and revolved in a direction of an arrow Bf illustrated in FIG. 2. The driven roller 3 is in contact with the belt 1 that is rotating and, thus, is driven to rotate by the belt 1. In addition, the driven roller 3 is maintained so as to be substantially parallel to the drive roller 2.

The tension roller 4 is disposed so as to be movable in a direction of an arrow T (a direction from the inner peripheral surface to the outer peripheral surface of the belt). The tension roller 4 has bearings 8 (8a, 8b) at both ends. The bearings 8 support tension roller shafts (4a, 4b) described below. The bearings 8 are supported by sliders 9 (9a, 9b) so as to be slidable in slit-shaped slider holding holes 10 (10a, 10b) that are formed in the first side plate 7a and the second side plate 7b. The slider 9 is biased by tension roller biasing spring 11 (11a, 11b) serving as a biasing unit. Thus, a tensional force is exerted on the belt 1. The tension roller 4 is in contact with the belt 1 that is rotating so as to be driven by the belt 1 to rotate.

The belt 1 has reinforcing tape 12 (12a, 12b), which are reinforcing members, on the outer peripheral surface thereof in the vicinity of both edges thereof in the belt width direction. The reinforcing tape 12 (12a, 12b) extends along the substantially entire circumference of the belt 1.

Figure 4A:
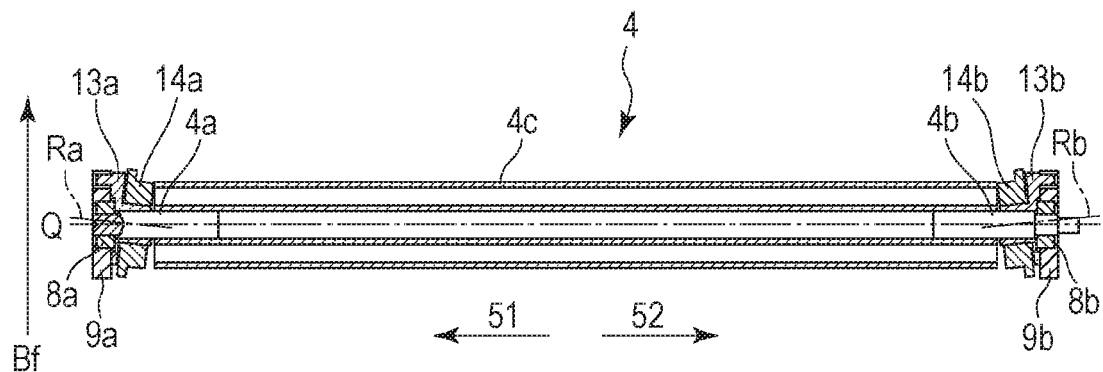
FIG. 4A is a cross-sectional view illustrating a relationship between an inclined flange roller and a tension roller.
Figure 4B:
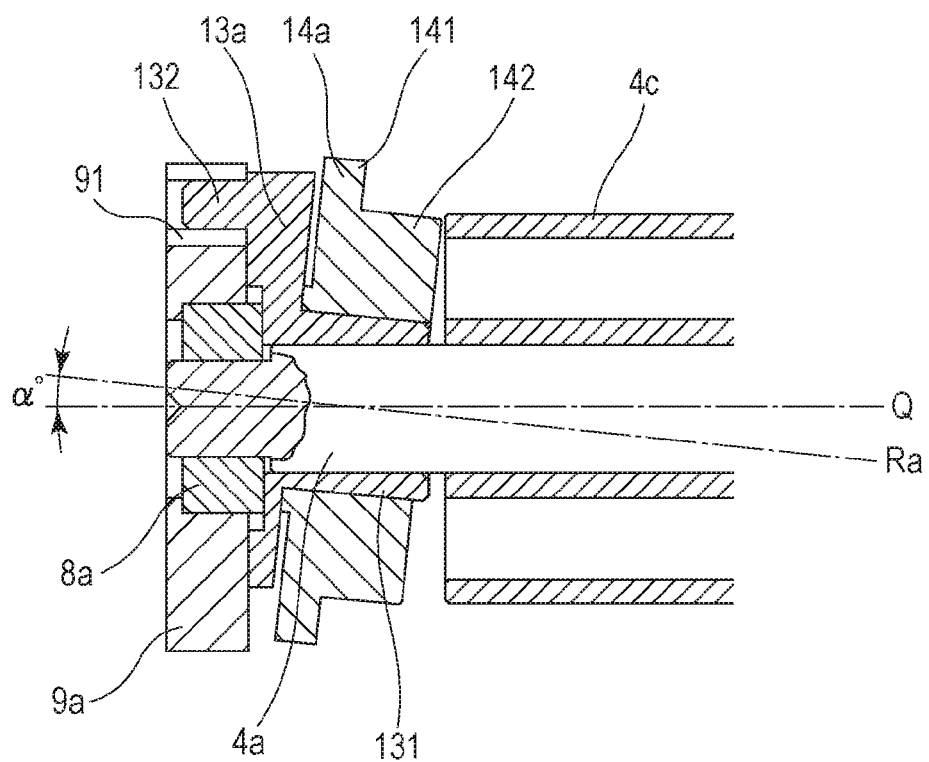
FIG. 4B is an enlarged view of the inclined flange roller.

The structures of the tension roller 4 and a regulation member are described below with reference to FIGS. 4A and 4B. FIG. 4A is a cross-sectional view of the tension roller 4 cut in a direction of an arrow 50 in FIG. 2 and viewed in a direction of an arrow 54 (from up to down in FIG. 2). FIG. 4B is an enlarged view of the left portion of the tension roller 4. As illustrated in FIGS. 4A and 4B, the tension roller 4 includes a three-arrow-shaped pipe 4c and tension roller shafts 4a and 4b press fitted into the three-arrow-shaped pipe 4c. The tension roller 4 is rotatably supported by the bearings 8a and 8b at both ends so as to be rotatable about a rotation axis Q of the tension roller 4. In addition, an inclined shaft 13 (13a, 13b) having a shaft portion 131 inclined at an angle of $\alpha°$ with respect to the rotation axis Q of the tension roller 4 toward a direction of the arrow is disposed at each of both ends of the three-arrow-shaped pipe 4c. A boss portion 132 is fitted into a rotation stopper 91 of the sliders 9 so as not to rotate. The inclined shaft 13 has an inclined flange roller 14 (14a, 14b) fitted thereinto. The inclined flange roller 14 serves as a regulation member and, thus, the inclined shaft 13 serves as a support member that supports the inclined flange roller 14.

As illustrated in FIGS. 4A and 4B, the inclined flange roller 14 (14a, 14b) is located outward of both ends of the tension roller 4 in the belt width direction. The inclined flange rollers 14 (14a, 14b) is rotatable about a rotation axis R (Ra, Rb) different than the rotation axis Q of the tension roller 4. As illustrated in FIG. 4B, the inclined flange roller 14a is inclined so that a portion of the inclined flange roller 14a located on a downstream side in the moving direction Bf of the belt 1 is away from the tension roller 4 and a portion of the inclined flange roller 14a located on an upstream side is close to the tension roller 4.

The inclined shaft 13 (13a, 13b) serves as the rotation shaft of the inclined flange roller 14 (14a, 14b). The inclined shaft 13 is positioned by being fitted into the tension roller shaft 4a, 4b. Thus, according to the present exemplary embodiment, the inclined shaft 13 can be more accurately positioned than in the case in which the tension roller shafts 4a and 4b and the inclined shaft 13 (13a, 13b) are separately formed and positioned.

Function of Inclined Flange Roller

The inclined flange roller 14 (14a, 14b) is configured so that if lateral shift of the belt 1 occurs in the belt width direction, a flange surface 141 serving as a first regulation portion is brought into contact with the edge of the shifted belt 1. Since the belt 1 is brought into contact with the flange surface 141, lateral shift of the belt 1 in the belt width direction is regulated. During the regulation, the edge of the belt 1 is maintained in contact with the flange surface 141. Such a shape of the inclined flange roller 14 (14a, 14b) can regulate lateral shift of the belt 1 and prevent buckling and damage of the edge of the belt 1 and, thus, a decrease in the durability of the edge of the belt 1. How to regulate the lateral shift is described below. Note that description below is made with reference to the case in which the belt 1 is shifted to one side (e.g., in the direction of an arrow 51 in FIG. 4A). Accordingly, description below is made with reference to the inclined flange roller 14a.

Figure 5A:
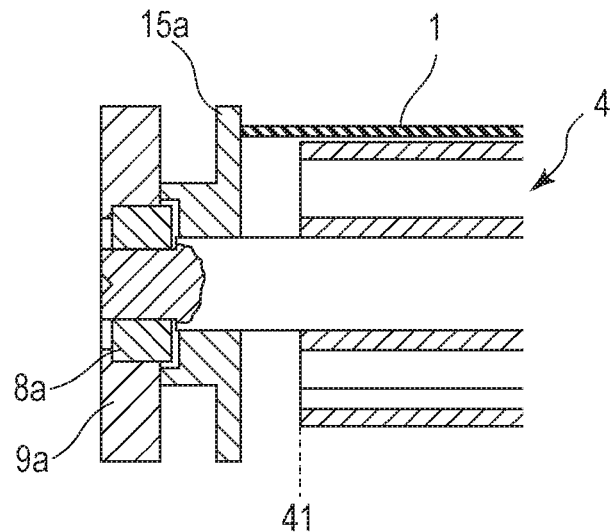
FIG. 5A is a cross-sectional view illustrating a relationship between a flange of a comparative example and the tension roller.
Figure 5B:
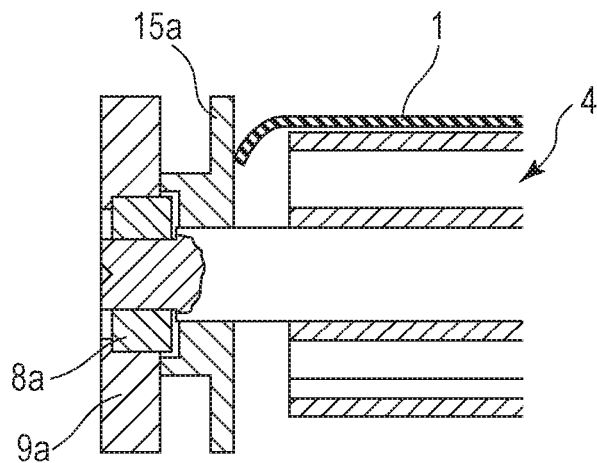
FIG. 5B illustrates a bend of a belt.
Figure 5C:
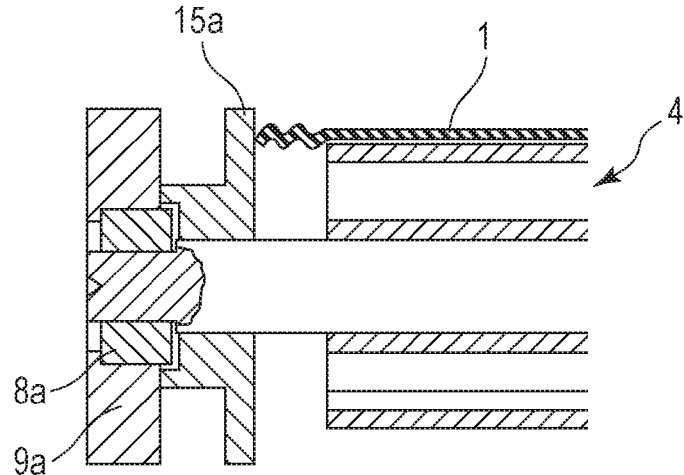
FIG. 5C illustrates buckling of the belt.

FIGS. 5A to 5C illustrate a flange 15a (a flange of a comparative example) disposed outward of the tension roller 4 instead of the inclined flange roller 14a of FIGS. 4A and 4B. As illustrated in FIG. 5A, if lateral shift of the belt 1 occurs, the edge portion of the belt 1 is brought into contact with an abutment surface of the flange 15a. In FIG. 5A, a gap is formed between the tension roller 4 and the flange 15a when the lateral shift of the belt 1 is regulated by the abutment surface. Accordingly, the belt 1 may enter the gap and, therefore, the edge portion of the belt 1 may bend as illustrated in FIG. 5B, or buckling may occur in the edge portion of the belt 1 due to a reaction force received from the flange 15a, as illustrated in FIG. 5C.

Figure 6:
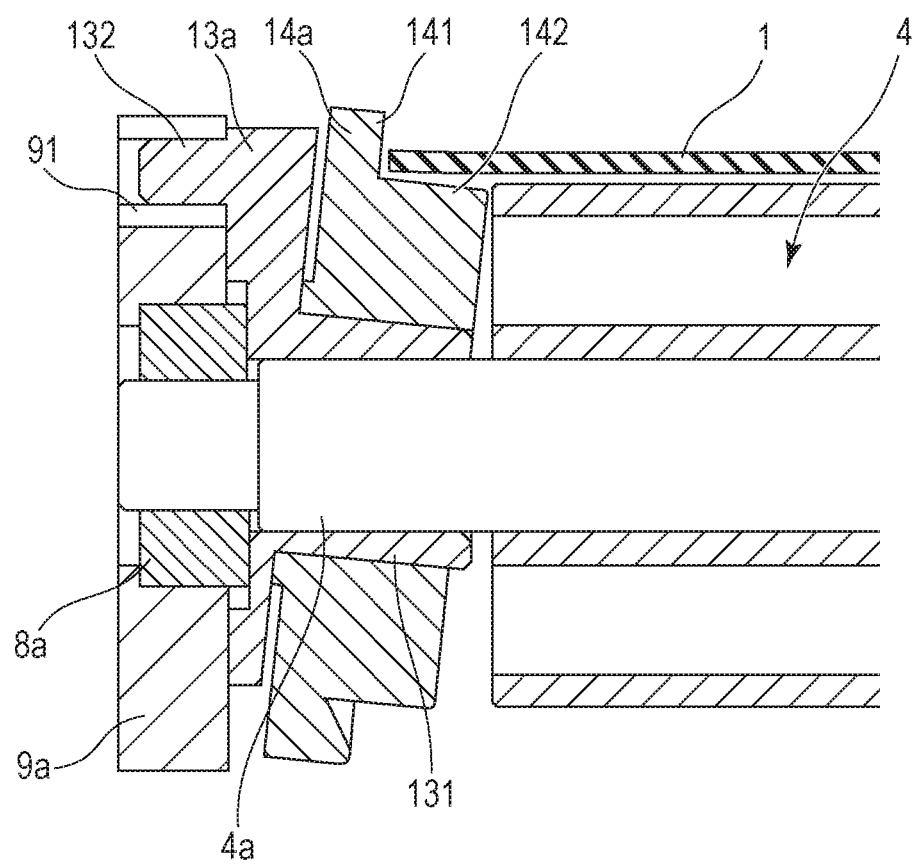
FIG. 6 is an enlarged view of the inclined flange roller and an edge portion of the belt that are in contact with each other.

FIG. 6 is an enlarged view of the inclined flange roller 14a and the edge portion of the belt 1 that are in contact with each other. As illustrated in FIG. 6, the inclined flange roller 14a has a roller surface 142, which serves as a second regulation portion, between the flange surface 141 and the tension roller 4. The roller surface 142 of the inclined flange roller 14a can be in contact with the inner peripheral surface of the belt 1 located in the gap formed between the flange surface 141 and the end portion of the tension roller 4 in the belt width direction. By allowing the roller surface 142 to be brought into contact with the inner peripheral surface of the belt 1, buckling occurring in the belt 1 caused by a reaction force from the flange surface 141 can be regulated when the belt 1 hits the flange surface 141.

Figure 7A:
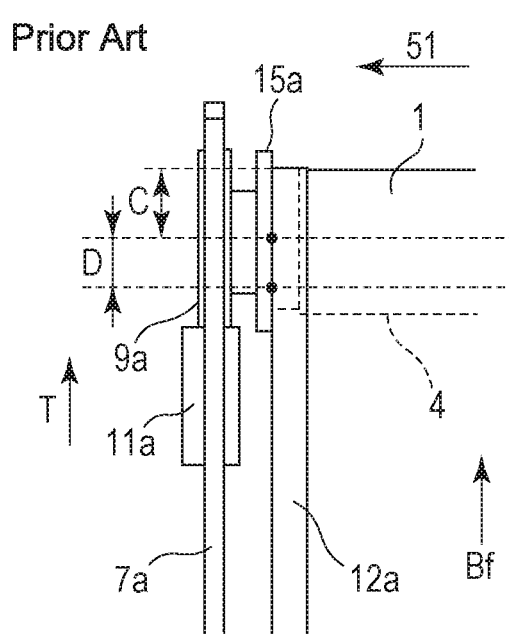
FIG. 7A is a top view illustrating a relationship between the flange of the comparative example and the tension roller.
Figure 7B:
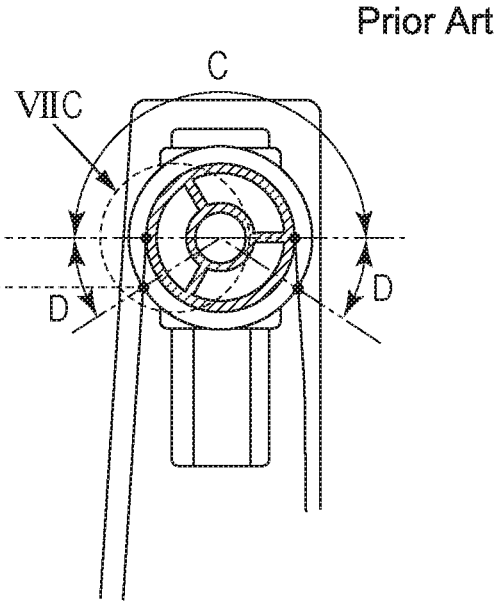
FIG. 7B is a side view corresponding to the top view.
Figure 7C:
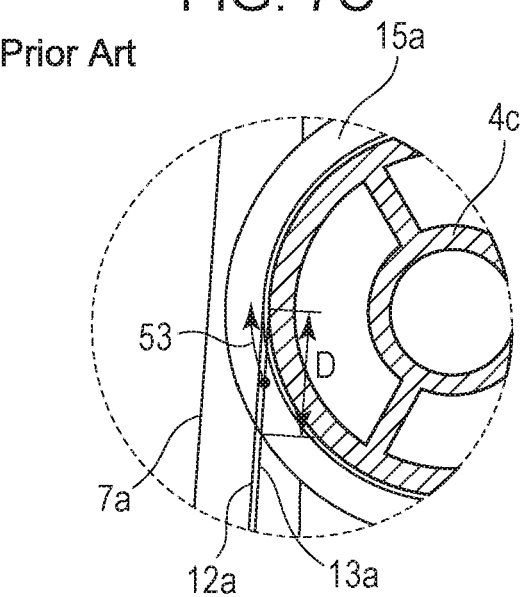
FIG. 7C is a partial enlarged view of FIG. 7B.

The advantages of the flange surface 141 of the inclined flange roller 14a are described below with reference to FIGS. 7A to 7C and FIGS. 8A and 8B. FIG. 7A is a top view illustrating a relationship between the flange 15a and the tension roller 4. FIG. 7B is a side view corresponding to the top view. Part of the side view indicated by a section VIIC of FIG. 7B is enlarged in FIG. 7C. If, as illustrated in FIGS. 7A to 7C, the flange 15a is disposed so as to be parallel to the edge surface of the belt 1, the belt 1 tends to be easily damaged from the edge thereof when the lateral shift of the belt 1 is regulated by the flange 15a.

When a force to shift the belt 1 in the direction of the arrow 51 is generated, the edge portion of the belt 1 is brought into contact with the flange 15a and, thus, the movement of the belt 1 is stopped. At that time, the edge portion of the belt 1 is in contact with the flange 15a in regions C and D. In the region C, the belt 1 is wound around the tension roller 4. In the region D, the belt 1 is not wound around the tension roller 4. More specifically, in the region C, the tension roller 4 is in contact with the inner peripheral surface of the belt 1 throughout the width of the tension roller 4. In contrast, in the region D (a region other than the region C), the tension roller 4 is not in contact with the inner peripheral surface of the belt 1 throughout the width of the tension roller 4.

If, in the region D, the edge portion of the belt 1 is in contact with the flange 15a for a long time or if the edge portion of the belt 1 is in contact with the flange 15a under a large force to shift the belt 1, the belt 1 tends to be easily damaged from the edge thereof, since the inner peripheral surface is not supported. Such damage occurs regardless of whether the flange 15a is rotating. In addition, as indicated by the enlarged view of FIG. 7C, when the flange 15a is rotating and if the edge portion of the belt 1 is in contact with the flange 15a in the region D, the edge portion of the belt 1 receives a force from the flange 15a in the direction of an arrow 53. Due to the force received from the flange 15a in the direction of an arrow 53, the edge portion of the belt 1 is raised. If such an operation is repeated, the belt 1 may be damaged from the edge portion thereof, or the edge portion of the belt 1 runs up onto the flange 15a.

Figure 8A:
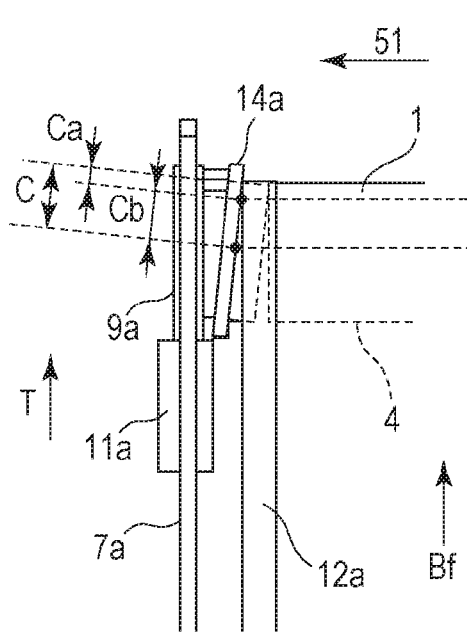
FIG. 8A is a top view illustrating a relationship between the inclined flange roller and the tension roller.
Figure 8B:
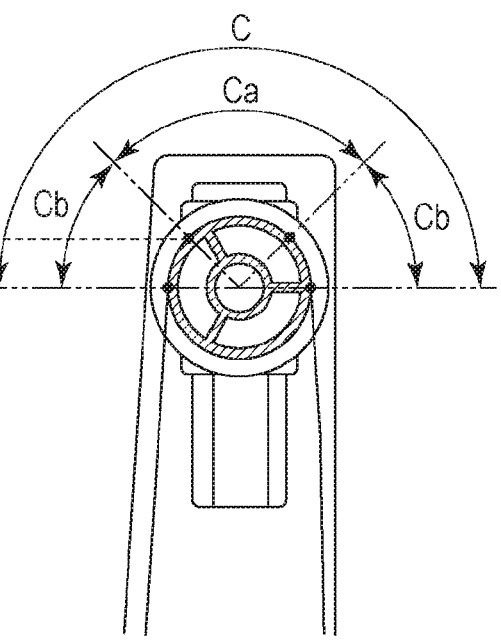
FIG. 8B is a side view corresponding to FIG. 8A.

FIG. 8A is a top view illustrating a relationship between the inclined flange roller 14a and the tension roller 4, and FIG. 8B is a side view corresponding to FIG. 8A. Like FIG. 4B, the rotation axis Q of the inclined flange roller 14a is inclined with respect to the tension roller 4 in FIGS. 8A and 8B. Accordingly, the flange surface 141 of the inclined flange roller 14a is inclined with respect to the edge portion of the belt 1. The inclined flange roller 14a is inclined so that the edge portion of the belt 1 is brought into contact with the flange surface 141 in only the region C when the belt 1 shifts in the direction of the arrow 51 and if the edge portion of the belt 1 hits the flange surface 141. That is, the flange surface 141 is inclined in a direction so as not to be in contact with the edge portion of the belt 1 in the region D. Thus, the flange surface 141 can prevent the belt 1 from being damaged or from running up onto the flange 15a due to a rise of the edge portion of the belt 1.

In addition, in a sub-region Ca of the region C in which the belt 1 significantly receives the tension from the tension roller 4 in the direction of an arrow T, the tightness of contact between the tension roller 4 and the inner peripheral surface of the belt 1 is higher than in the other region. Buckling can be more easily prevented under a high tightness of contact than under a low tightness of contact between the tension roller 4 and the inner peripheral surface of the belt 1. Accordingly, since the movement of the edge portion of the belt 1 is regulated by the flange surface 141 of the inclined flange roller 14a in the sub-region Ca in which the tightness of contact is high, the lateral shift of the belt can be regulated without the occurrence of buckling.

In addition, the inner peripheral surface of the belt 1 located in the gap between the tension roller 4 and the flange surface 141 in the sub-region Ca in which the tightness of contact is high can be regulated using the roller surface 142. Accordingly, even when the edge portion of the belt 1 starts to bend in the sub-region Ca in which buckling negligibly occurs, buckling can be reliably prevented since the roller surface 142 regulates the movement of the inner peripheral surface of the belt 1.

Figure 9:
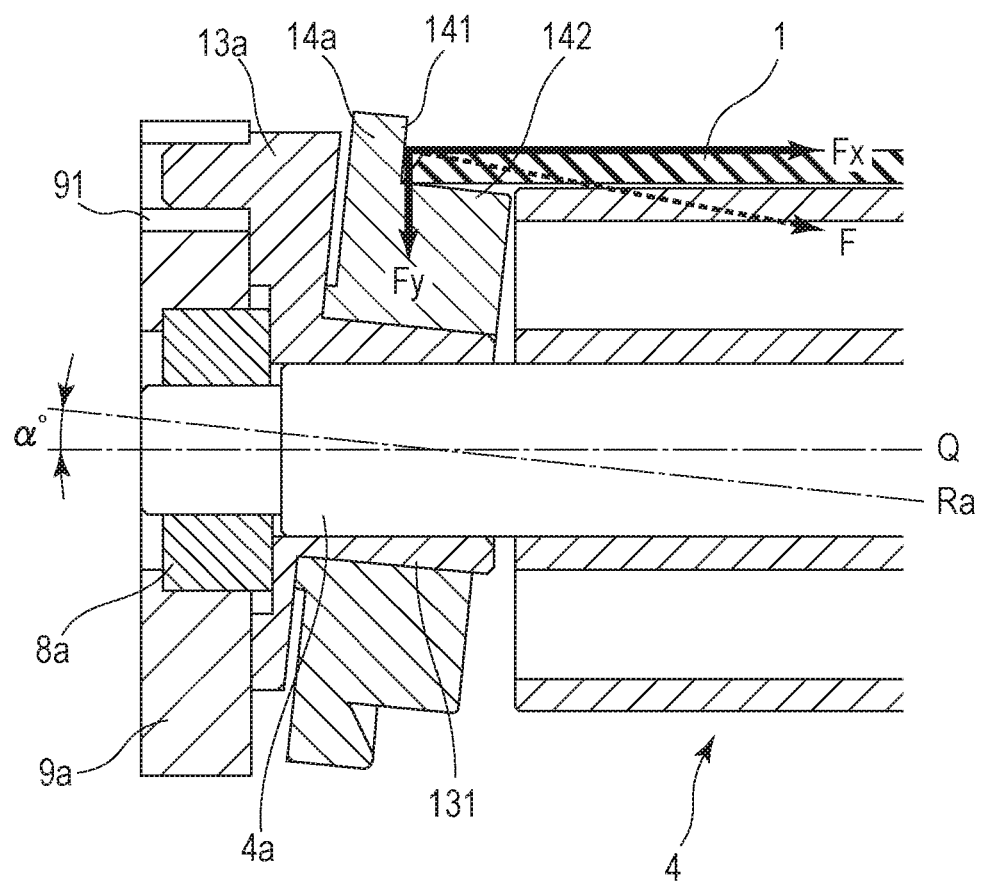
FIG. 9 illustrates the reaction force that the edge portion of the belt receives from the inclined flange roller according to the first exemplary embodiment.

Furthermore, by using the flange surface 141 that is inclined, curling of the edge portion of the belt 1 can be prevented. FIG. 9 illustrates the reaction force that the edge portion of the belt 1 receives from the flange surface. As illustrated in FIG. 9, if the belt 1 is laterally shifted, the belt 1 receives a reaction force F from the flange surface 141. Since the flange surface 141 is inclined, the reaction force F is divided into an x-direction component Fx and a y-direction component Fy. Due to the y-direction component Fy, the belt 1 is pressed against the tension roller 4 and, thus, curling of the belt 1 can be prevented.

Figure 10:
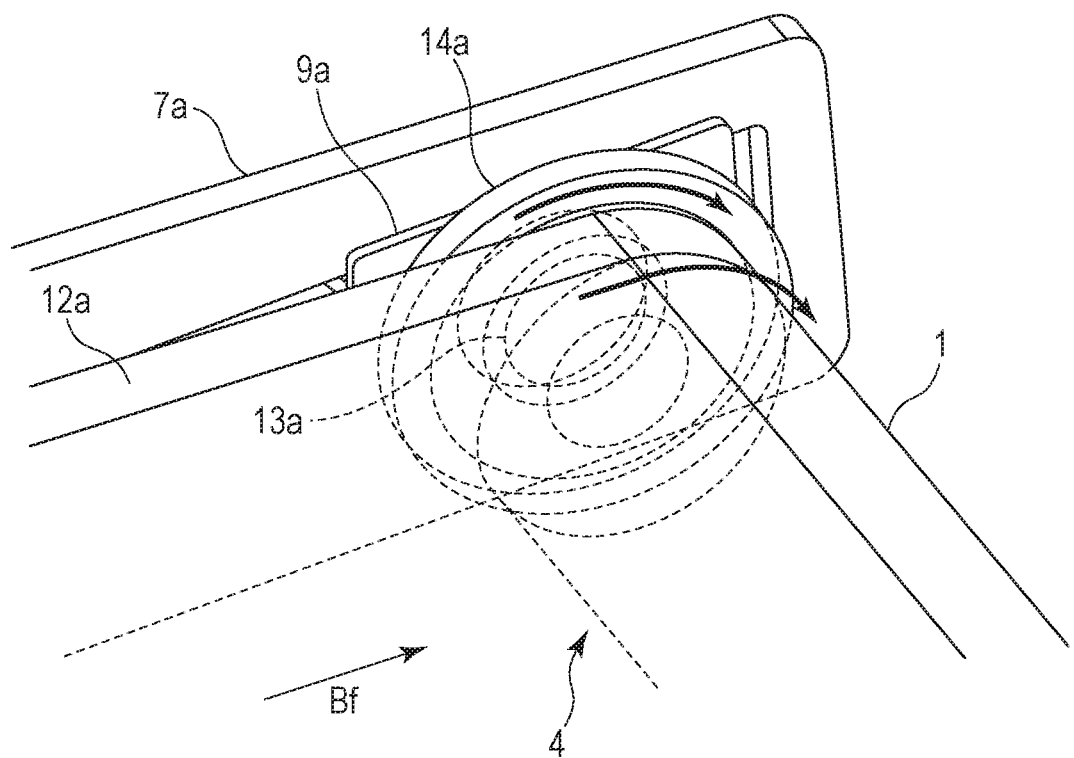
FIG. 10 is a perspective view of the inclined flange roller and the edge portion of the belt.

FIG. 10 is a perspective view of the inclined flange roller 14a and the edge portion of the belt 1. As illustrated in FIG. 10, the inclined flange roller 14a is rotatably attached to the inclined shaft 13a. Accordingly, the inclined flange roller 14a is driven to rotate by the belt 1. Thus, when the flange surface 141 is bought into contact with the edge portion of the belt 1, sliding friction is negligibly generated. As a result, damage of the belt 1 caused by scraping of the edge portion of the belt 1 can be prevented.

While the present exemplary embodiment has been described with reference to the belt 1 laterally shifted in the direction of the arrow 51, lateral shift of the belt 1 in the direction of an arrow 52 can be also regulated by the inclined flange roller 14b, since the inclined flange rollers 14 are provided at either end of the tension roller 4. Note that the inclined flange roller 14b is provided so as to be bilaterally symmetrical with respect to the inclined flange roller 14a and has a function similar to the inclined flange roller 14a.

While the present exemplary embodiment has been described with reference to the intermediate transfer unit 120 including three rollers, the present exemplary embodiment is applicable to an intermediate transfer unit including three or more rollers. According to the present exemplary embodiment, the intermediate transfer unit 120 can include at least two rollers, that is, the drive roller 2 and the tension roller 4.

Figure 11A:
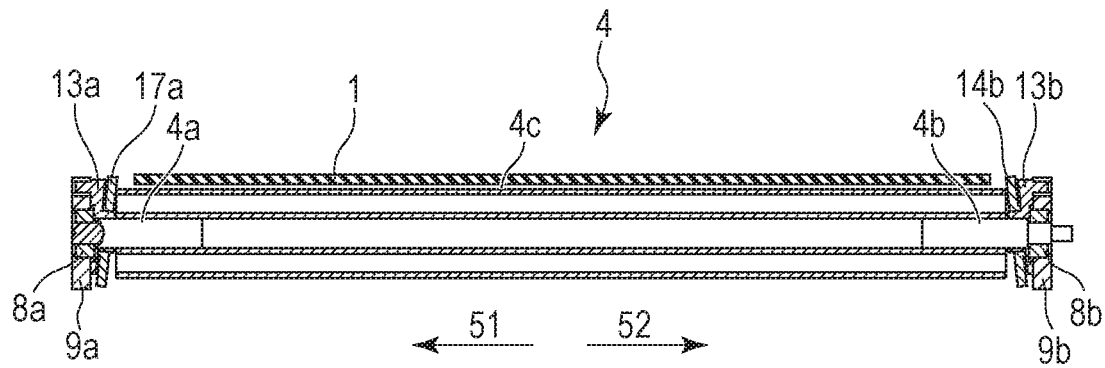
FIG. 11A is a cross-sectional view of another inclined flange roller according to the first exemplary embodiment.
Figure 11B:
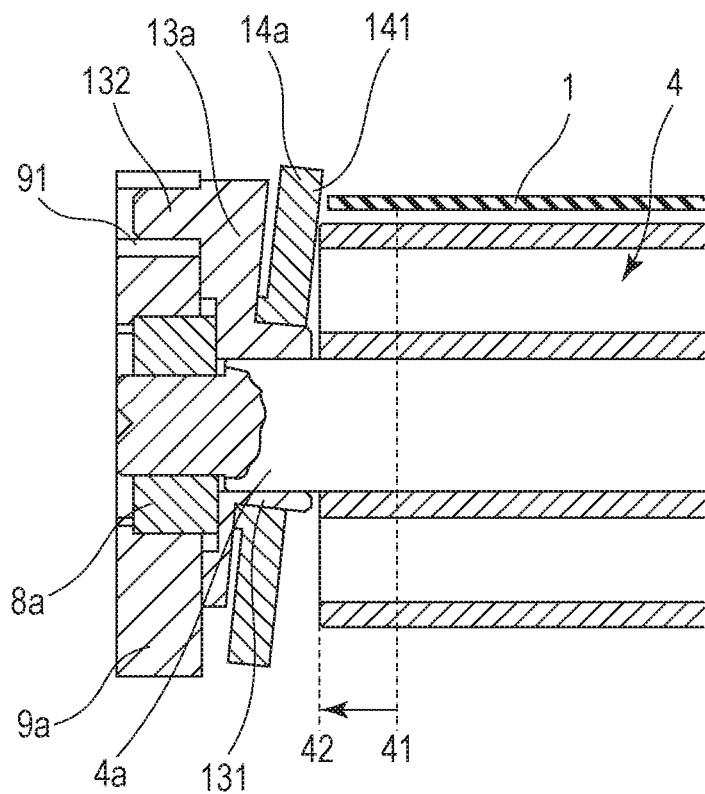
FIG. 11B is an enlarged view of the inclined flange roller.

In addition, the present exemplary embodiment is applicable to the tension roller 4 having a length that is longer than the length of the belt 1 in the belt width direction, as illustrated in FIG. 11A. As illustrated in FIG. 11B, by extending an end surface 41 of the tension roller 4 to a position indicated by a dotted line 42, that is, the position of the flange surface 141, the tension roller can function as the roller surface 142 of the inclined flange roller 14. However, it is difficult to completely remove the gap formed between the tension roller 4 and the inclined flange roller 14. The gap may cause buckling. Accordingly, if the flange surface 141 and the roller surface 142 are formed so as to be integrated with each other and, thus, the flange surface 141 is seamlessly connected to the roller surface 142, buckling is more easily prevented.

As described above, according to the present exemplary embodiment, by using the inclined flange rollers 14a and 14b provided at either end of the tension roller 4, the lateral shift of the belt can be regulated without a decrease in the durability of the edge portion of the belt 1.

Second Exemplary Embodiment

According to the first exemplary embodiment, the lateral shift of the belt is regulated by using the inclined flange rollers 14a and 14b that are rotatable independently from the tension roller 4. In contrast, according to the present exemplary embodiment, the inclined flange rollers 14a and 14b are rotatable in synchronization with the rotation of the tension roller 4. Note that since the other structures are similar to those of the image forming apparatus according to the first exemplary embodiment, the same numbering is used for similar components of the present exemplary embodiment in the following description.

Figure 12A:
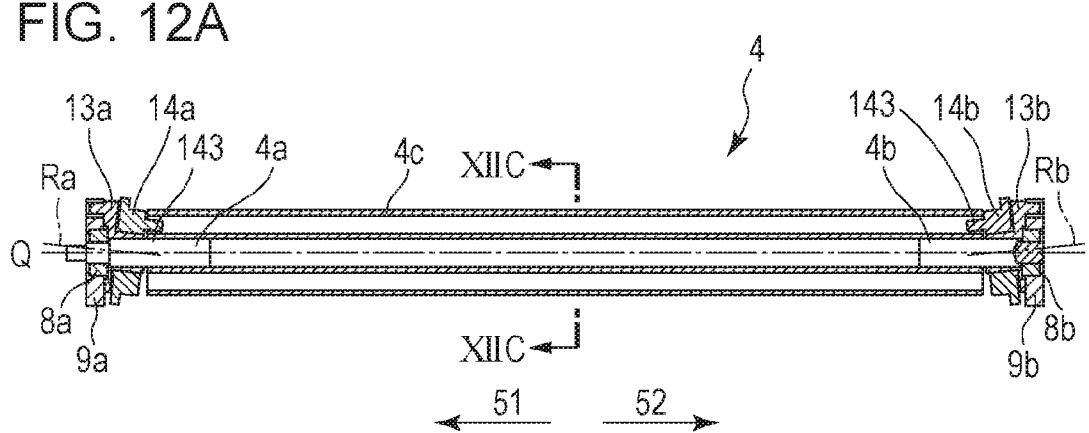
FIG. 12A is a cross-sectional view illustrating a relationship between an inclined flange roller and a tension roller according to a second exemplary embodiment.
Figure 12B:
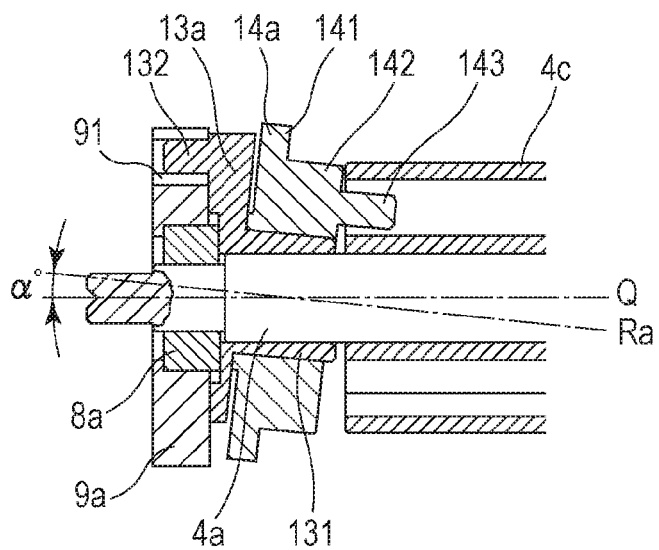
FIG. 12B is an enlarged view of the inclined flange roller according to the second exemplary embodiment.
Figure 12C:
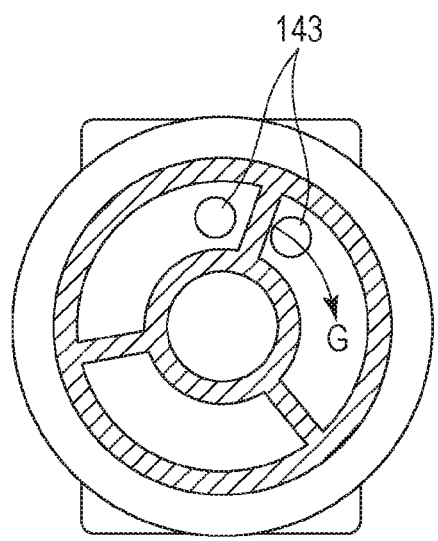
FIG. 12C is a cross-sectional view taken along a line XIIC-XIIC of FIG. 12A.

FIG. 12A is a cross-sectional view of a tension roller 4 according to the second exemplary embodiment. By causing the inclined flange roller 14 of the first exemplary embodiment to rotate in synchronization with the rotation of the tension roller 4, the inclined flange roller 14 and the tension roller 4 are rotatable at the same angular velocity. FIG. 12B is an enlarged view of a left section of the tension roller 4 in FIG. 12A. FIG. 12C is a cross-sectional view taken along a line XIIC-XIIC of FIG. 12A.

The inclined shaft 13a having a shaft portion 131 inclined at an angle of α° with respect to the rotation axis Q of the tension roller 4 toward a direction of the arrow is disposed by fitting the boss portion 132 into the rotation stopper 91 of a slider 9a. Thus, rotation of the inclined shaft 13a is stopped. In addition, the inclined flange roller 14a is fitted into the inclined shaft 13a. Furthermore, the inclined flange roller 14a has bosses 143. By fitting one side of the three-arrow-shaped pipe 4c of the tension roller 4 between the bosses 143, the inclined flange roller 14a can receive a rotary force from the three-arrow-shaped pipe 4c. Thus, the inclined flange roller 14a is rotatable together with the tension roller 4. At that time, the tension roller 4 rotates about the rotation axis Q, and the inclined flange roller 14 rotates about the rotation axis R as if the tension roller 4 and the inclined flange roller 14 are connected using a universal joint. In this manner, the tension roller 4 and the inclined flange roller 14 rotate about different rotation axes.

According to the first exemplary embodiment, the inclined flange roller 14 is disposed so as to be rotatable with respect to the tension roller 4. Accordingly, the inclined flange roller 14 starts rotating when the edge portion of the belt 1 is brought into contact with the roller surface 142 or the flange surface 141. Thus, if some load (e.g., the sliding load with the inclined shaft 13) is imposed on the inclined flange roller 14, the speed of the edge portion of the belt 1 may differ from the speed of the flange surface 141.

Such a difference in speed may cause sliding friction between the inclined flange roller 14 and the belt 1. If the sliding friction is large, the edge portion of the belt 1 may be scraped off and be damaged.

According to the present exemplary embodiment, the bosses 143 are provided on the inclined flange roller 14, and a rotational driving force is applied from the tension roller 4 to the inclined flange roller 14. Accordingly, the belt 1 can rotate at the same speed as the inclined flange roller 14 without being in contact with the inclined flange roller 14. As a result, even when some rotational load is imposed on the inclined flange roller 14, the sliding friction between the edge portion of the belt 1 and the inclined flange roller 14 can be removed.

As described above, according to the present exemplary embodiment, a decrease in the durability of the edge portion of the belt 1 can be more reduced than in the first exemplary embodiment.

Third Exemplary Embodiment

The first exemplary embodiment has been described with reference to regulation of the lateral shift of the belt 1 using the inclined flange rollers 14a and 14b that can rotate independently from the tension roller 4. In contrast, according to the present exemplary embodiment, a decrease in the durability of the belt 1 is reduced more than in the first exemplary embodiment by changing the shape of the inclined flange rollers 14a and 14b. Note that since the other structures are similar to those of the image forming apparatus according to the first exemplary embodiment, the same numbering is used for similar components of the present exemplary embodiment in the following description.

Figure 13A:
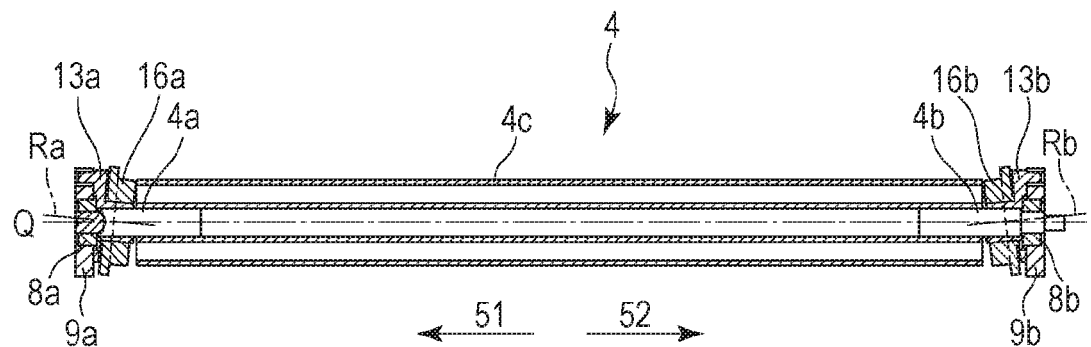
FIG. 13A is a cross-sectional view illustrating an inclined flange roller according to a third exemplary embodiment.
Figure 13B:
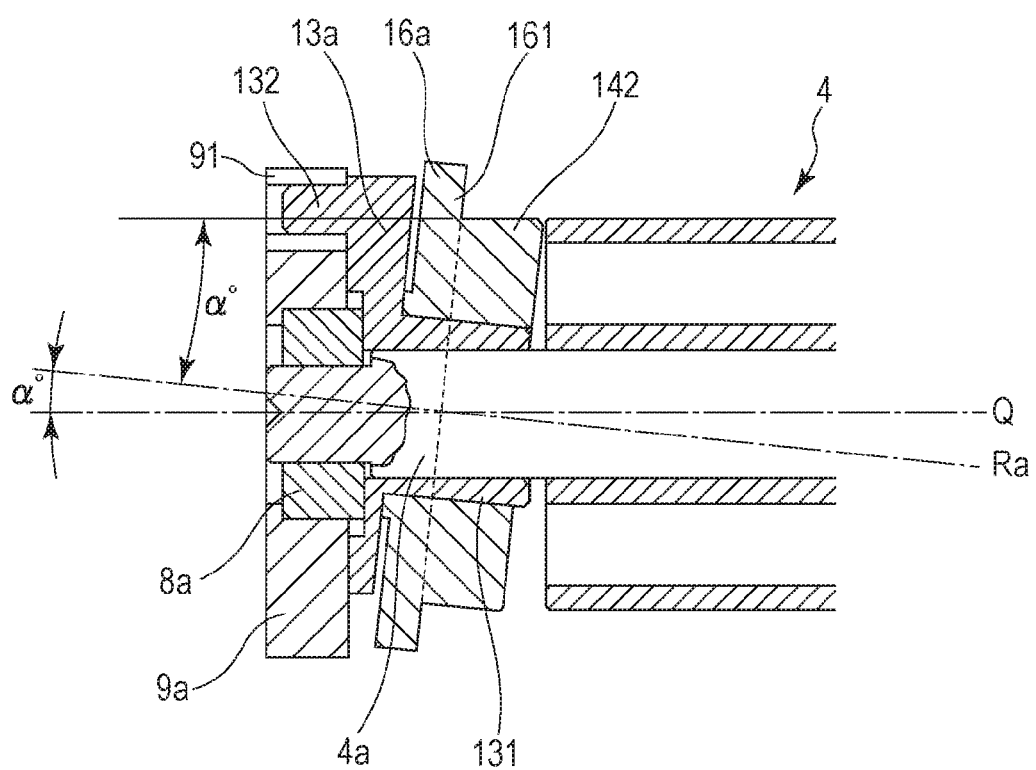
FIG. 13B is an enlarged view of the inclined flange roller.

FIG. 13A is a cross-sectional view of a configuration in which an inclined flange roller 16 (16a, 16b) is employed instead of the inclined flange roller 14 (14a, 14b). FIG. 13B is an enlarged view of the left section of FIG. 13A. The inclined flange roller 16 has a roller surface 162 inclined at an angle of α° with respect to a rotation axis Ra.

Figure 14A:
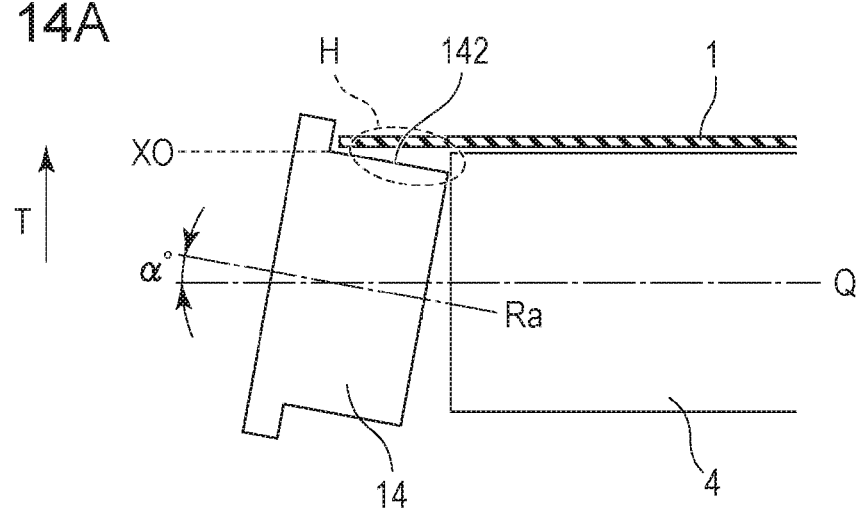
FIGS. 14A to 14C illustrate the inclination angle α of the inclined flange roller and a gap H.
Figure 14B:
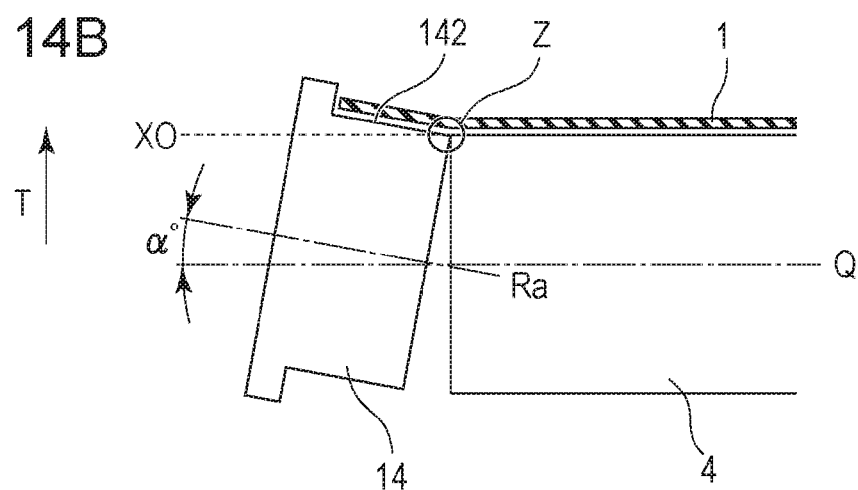
Figure 14C:
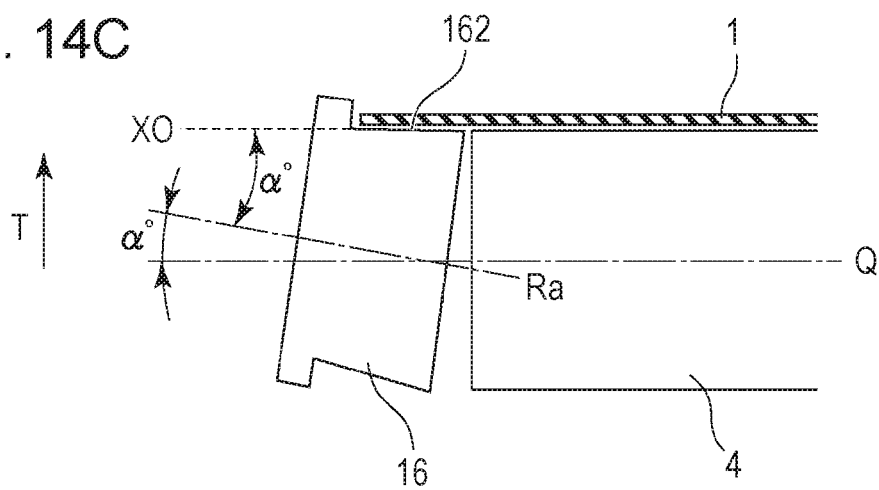

FIGS. 14A to 14C illustrate the inclination angle α of the inclined flange roller 14 and a gap H. As illustrated in FIG. 14A, the gap H formed between the belt 1 and the roller surface 142 increases with increasing inclination angle α of the inclined flange roller 14. When the gap H is large and if the belt 1 is shifted toward the roller surface 142, the inner peripheral surface of the belt 1 is not supported by the roller surface 142 and, thus, the occurrence of buckling cannot be prevented. To solve such a problem, as illustrated in FIG. 14B, the inclined flange roller 14 can be moved in the direction of the arrow T so that an end Z of the roller surface 142 that is adjacent to a tension roller is set at a position X0. In this manner, the gap H disappears, and bucking negligibly occurs. However, the roller surface 142 protrudes from the position X0 in the direction of the arrow T (a biasing direction) and, thus, the tension applied to the belt 1 is localized to the contact portion of the flange. Accordingly, the edge surface of the belt 1 is damaged. At that time, the position of a surface of the tension roller 4 in the biasing direction is defined as X0.

Accordingly, the shape of the inclined flange roller 14 is determined as the shape of the inclined flange roller 16 according to the present exemplary embodiment so that the gap H is filled. The shape is illustrated in FIG. 14C. To form the shape, the roller surface 162 serving as a second regulation portion of the inclined flange roller 16 is inclined at an angle of α° with respect to the rotation axis Ra, and the rotation axis Ra of the inclined flange roller 16 is inclined at an angle of α° with respect to the rotation axis Q of the tension roller 4. As illustrated in FIG. 14C, in the inclined flange roller 16, the angle formed by the flange surface 141 and the roller surface 162 is 90 degree and less. By using the inclined flange roller 16 having such a structure, the roller surface 162 can be located inward of the position X0 in the biasing direction T, the gap H illustrated in FIG. 14A can be removed, and buckling can be easily prevented. In addition, the tension (the pressure) applied to the tension roller 4 is uniform along the belt width direction and, therefore, the tension is not localized.

Figure 15A:
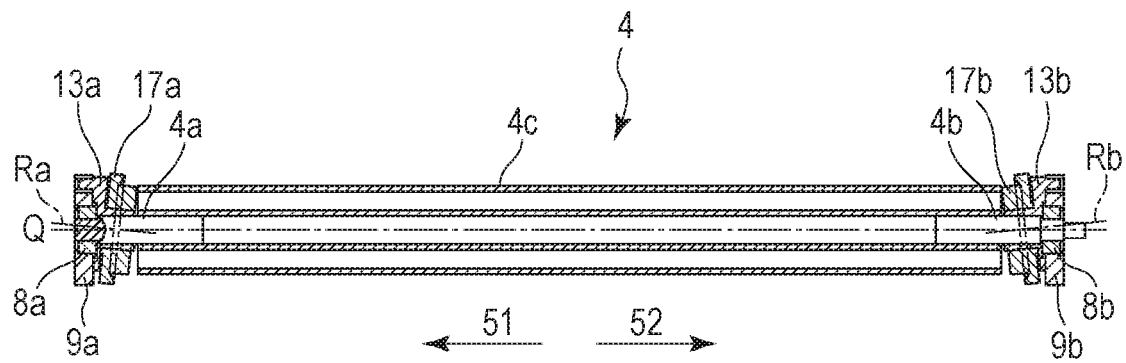
FIG. 15A is a cross-sectional view of an inclined flange roller according to a modification of the third exemplary embodiment.
Figure 15B:
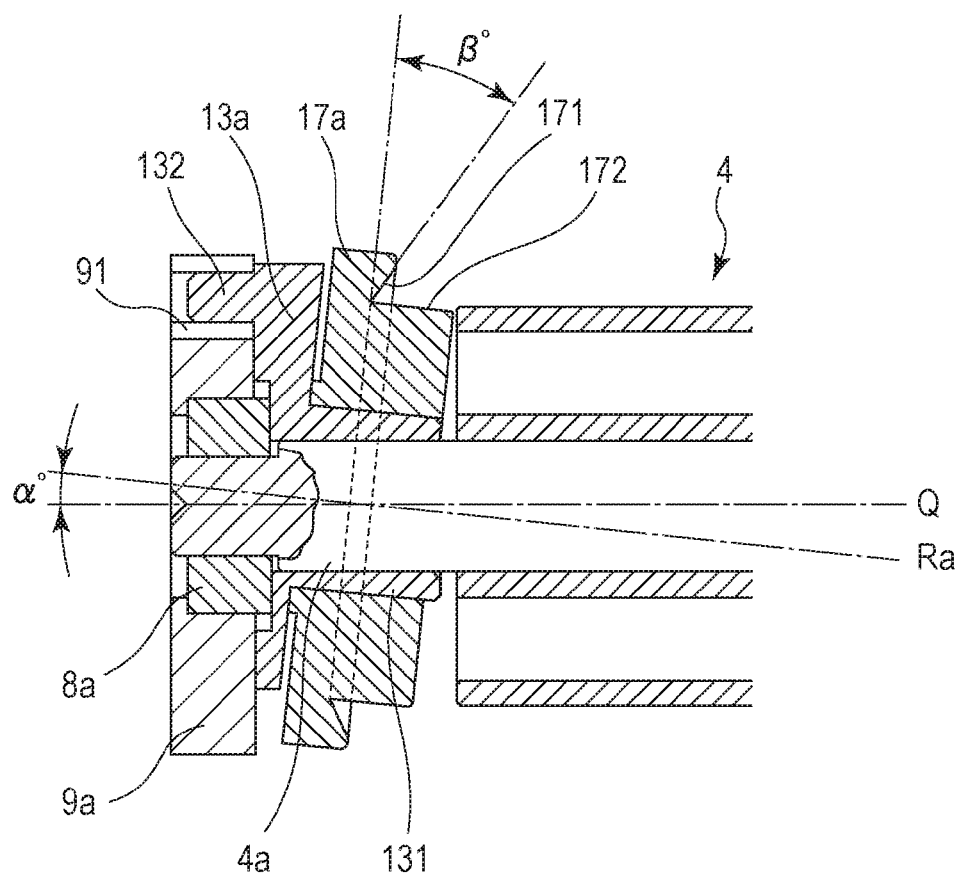
FIG. 15B is an enlarged view of the inclined flange roller according to the modification of the third exemplary embodiment.

A modification of the present exemplary embodiment is described below. FIG. 15A is a cross-sectional view of the structure in which an inclined flange roller 17 (17a, 17b) is provided instead of the inclined flange roller 16 (16a, 16b). FIG. 15B is an enlarged view of the left section of FIG. 15A. The inclined flange roller 17a has a flange surface 171 inclined toward a roller surface 172 at an angle of β°.

As described above, the first exemplary embodiment has an advantage in that curling of the belt 1 can be prevented by inclining the flange surface 141 of the inclined flange roller 14. However, in order to increase the inclination angle, the inclined flange roller 14 needs to be significantly inclined. To dispose the inclined flange roller 14, a space for the inclined flange roller 14 is needed in the axis direction. Thus, as illustrated in FIG. 14A, the gap H is increased and, therefore, buckling easily occurs.

Accordingly, a structure in which even when the inclination angle of the rotation axis Ra of the inclined flange roller 17 is the same as in the above-described exemplary embodiment as illustrated in FIG. 15A, curling and buckling negligibly occur is described below with reference to FIGS. 15B and 16.

Figure 16:
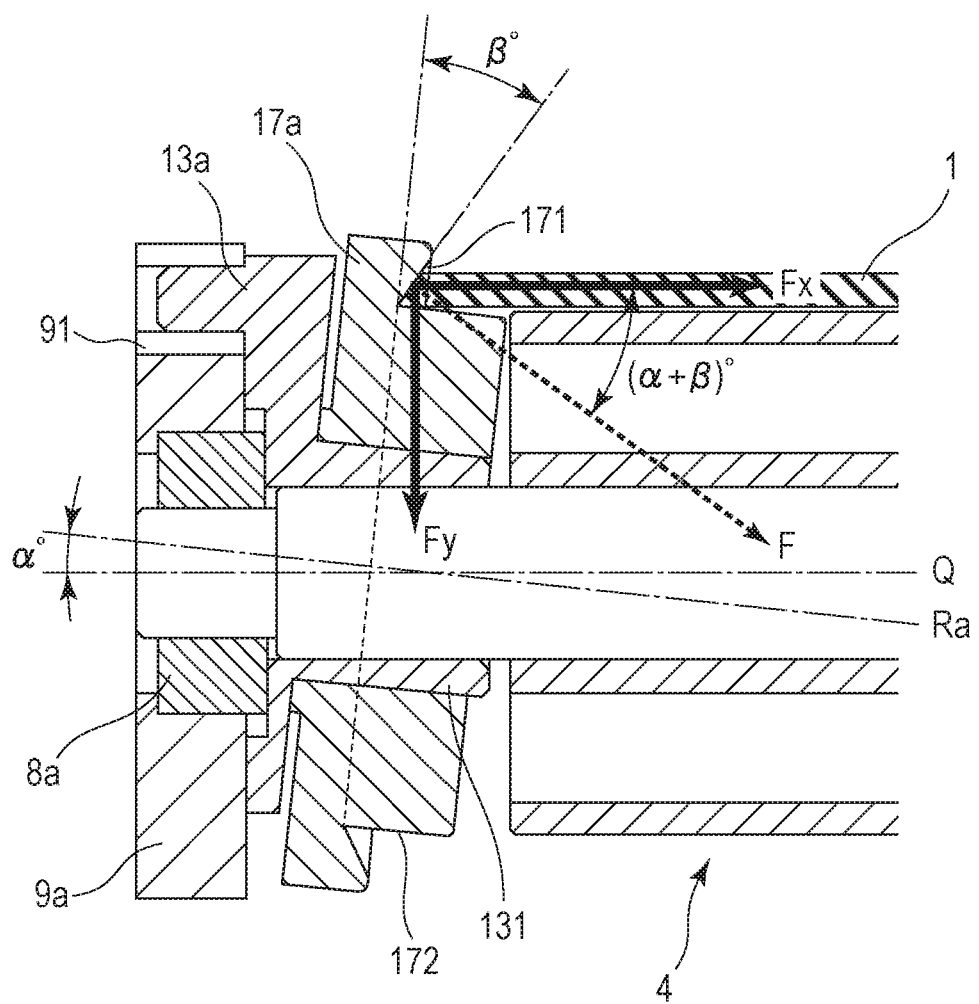
FIG. 16 illustrates the reaction force received by the edge portion of a belt according to the third exemplary embodiment from the inclined flange roller.

As illustrated in FIG. 16, a flange surface 171 inclined at an angle of β° toward the roller surface 172 is provided. As a result, if the belt 1 is shifted toward the flange surface 171, the belt 1 receives a reaction force F from the flange surface 171. The reaction force F can be divided into an x-direction component Fx and a y-direction component Fy. Since the flange surface 171 is inclined at an angle of β°, the y-direction component Fy that presses the belt 1 against the roller surface 172 is given as follows:

$$Fy = F \sin(\alpha + \beta).$$

As a result, in the range of $0 < \alpha + \beta < 90°$, the force Fy that presses the belt 1 against the roller surface 172 can be increased by providing the inclination of an angle of β° and, thus, buckling can be easily prevented.

In addition, the rotation axis Ra of the inclined flange roller 17a is inclined at an angle of α°, so that the flange surface 171 is inclined at an angle of β° and the edge portion of the belt 1 is in contact with the flange surface 171.

As described above, according to the present exemplary embodiment, a decrease in the durability of the edge portion of the belt 1 is reduced more than in the first exemplary embodiment Fourth Exemplary Embodiment According to the first exemplary embodiment, lateral shift of the belt 1 is regulated by using the inclined flange rollers 14a and 14b that are rotatable independently from the tension roller 4. In contrast, according to the present exemplary embodiment, lateral shift of the belt is regulated by using a flange having a shape that differs from the shape of the inclined flange rollers 14a and 14b. Note that since the other structures are similar to those of the image forming apparatus according to the first exemplary embodiment, the same numbering is used for similar components of the present exemplary embodiment in the following description.

Figure 17A:
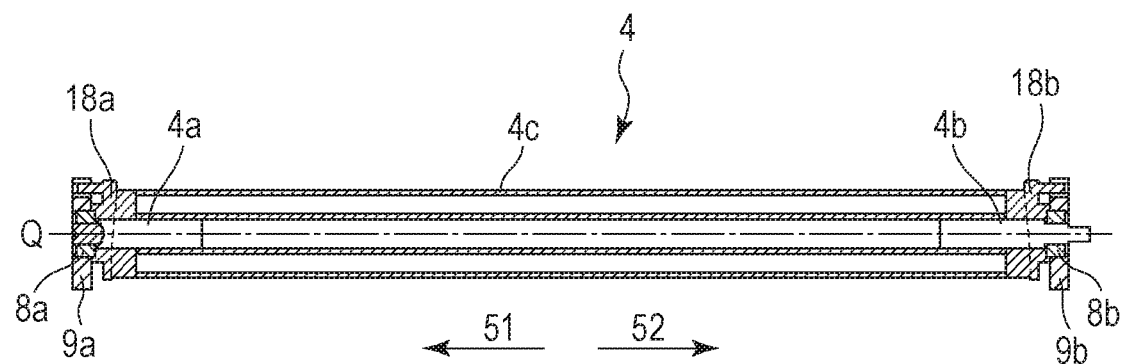
FIG. 17A is a cross-sectional view of a flange and a tension roller according to a fourth exemplary embodiment.
Figure 17B:
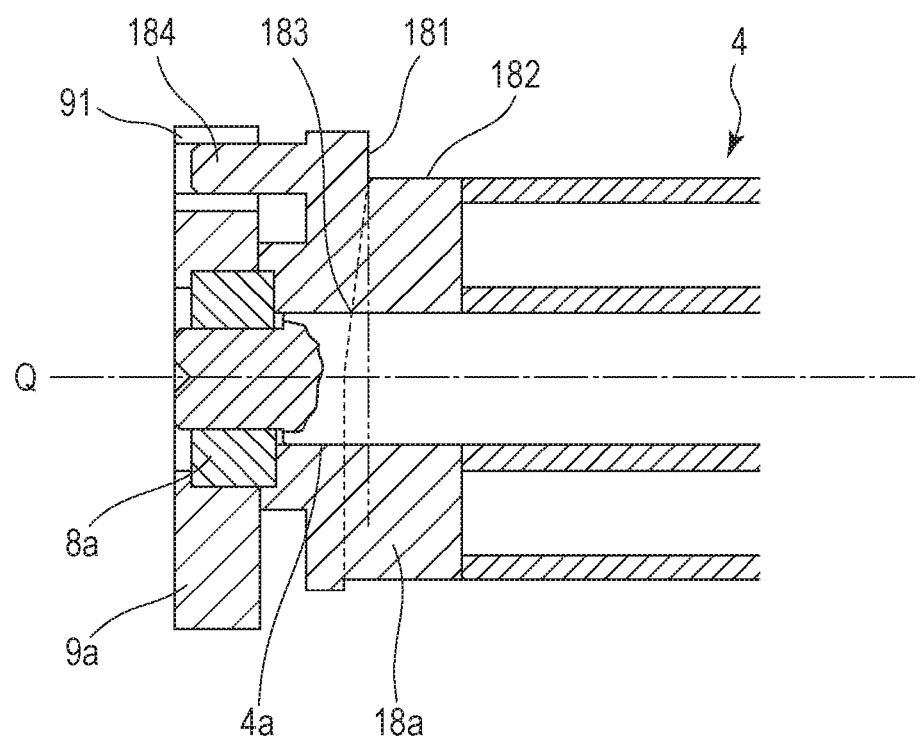
FIG. 17B is an enlarged view of the flange according to the fourth exemplary embodiment.

FIG. 17A is a cross-sectional view of the tension roller 4 according to the present exemplary embodiment. The inclined flange roller 14 (14a, 14b) is replaced with a flange 18 (18a, 18b). FIG. 17B is an enlarged view of the left section of FIG. 17A. The flange 18a is fitted into the tension roller shaft 4a, and the rotation of the flange 18a is stopped by a boss 184. Accordingly, the flange 18a remains unrotated without using the inclined shaft 13a of the first exemplary embodiment. The inclined flange 18a has a flange surface 181 capable of being in contact with the edge portion of the belt 1, a roller surface 182 capable of being in contact with the inner peripheral surface of the belt 1, and a retraction surface 183. The flange surface 181 and the roller surface 182 have functions that are the same as those of the flange surface 141 and the roller surface 142 of the inclined flange roller 14a, respectively.

Figure 18A:
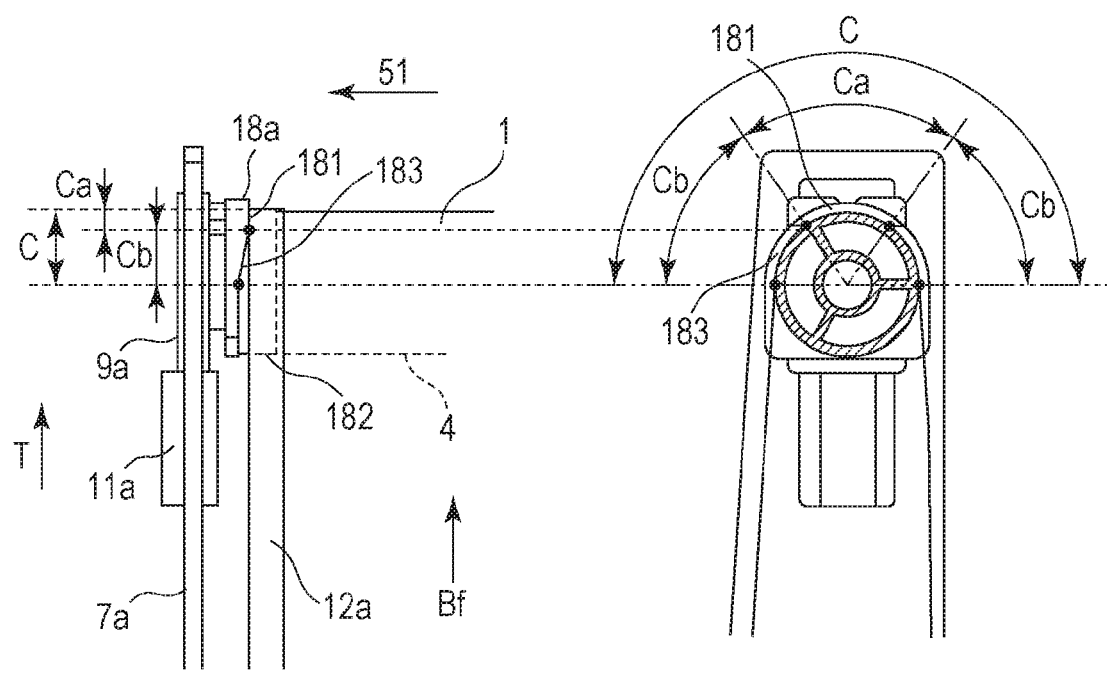
FIGS. 18A and 18B illustrate the function of a retraction surface of the flange according to the fourth exemplary embodiment.
Figure 18B:
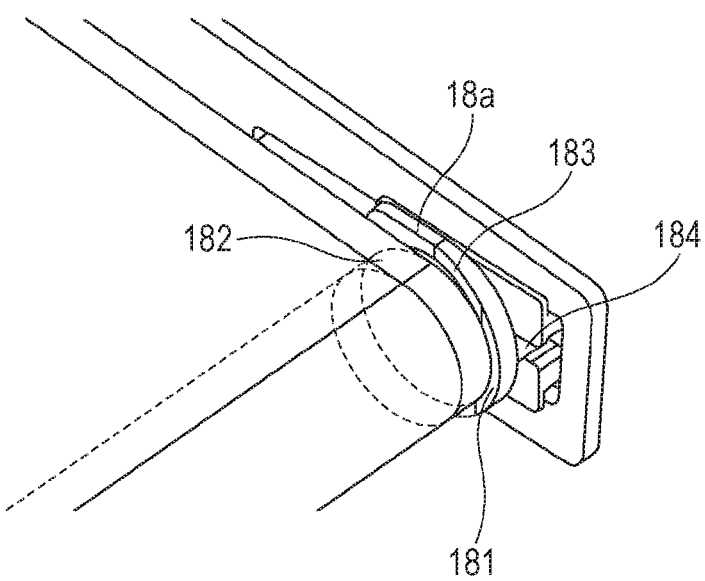

FIGS. 18A and 18B illustrate the function of the retraction surface 183 of the flange 18a. FIG. 18A is a top view illustrating a relationship between the flange 18a and the tension roller 4 and a side view corresponding to the top view. FIG. 18B is a perspective view illustrating a relationship between the retraction surface 183 and the edge portion of the belt 1.

If the belt 1 is laterally shifted in the direction of the arrow 51, the edge portion of the belt 1 in the sub-region Ca is brought into contact with the flange surface 181 of the inclined flange 18a. The retraction surface 183 of the flange 18a is retracted outwardly in the belt width direction so as not to be in contact with the edge portion of the belt 1 in a sub-region Cb. By causing the retraction surface 183 to retract, lateral shift of the belt 1 can be prevented while preventing a decrease in the durability of the edge portion of the belt 1 without rotating the flange 18a, as in the first exemplary embodiment.

Fifth Exemplary Embodiment

According to the first exemplary embodiment, lateral shift of the belt is regulated using the inclined flange rollers 14a and 14b that are rotatable independently from the tension roller 4. In contrast, the present exemplary embodiment is characterized in that the inclined shaft 13 (13a, 13b) has an angle regulation surface serving as a holding portion that regulates the angle of the inclined flange roller 14a, 14b. Note that since the other structures are similar to those of the image forming apparatus according to the first exemplary embodiment, the same numbering is used for similar components of the present exemplary embodiment in the following description.

Figure 19A:
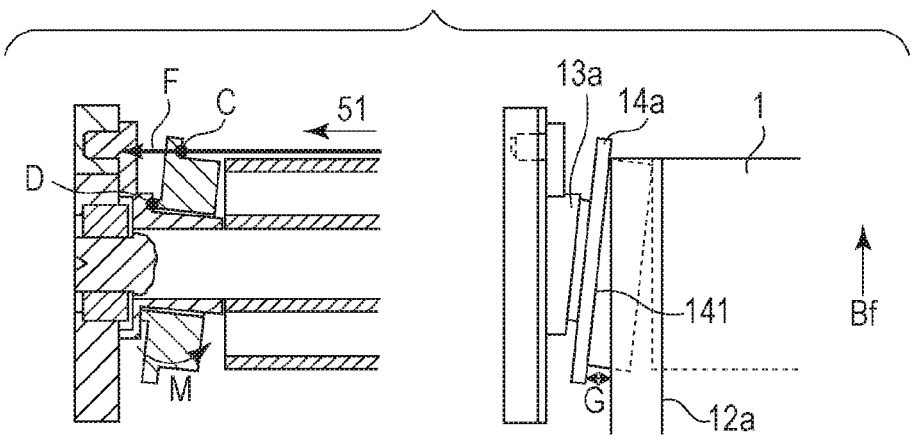
FIG. 19A illustrates the edge portion of the belt in contact with the inclined flange roller.
Figure 19B:
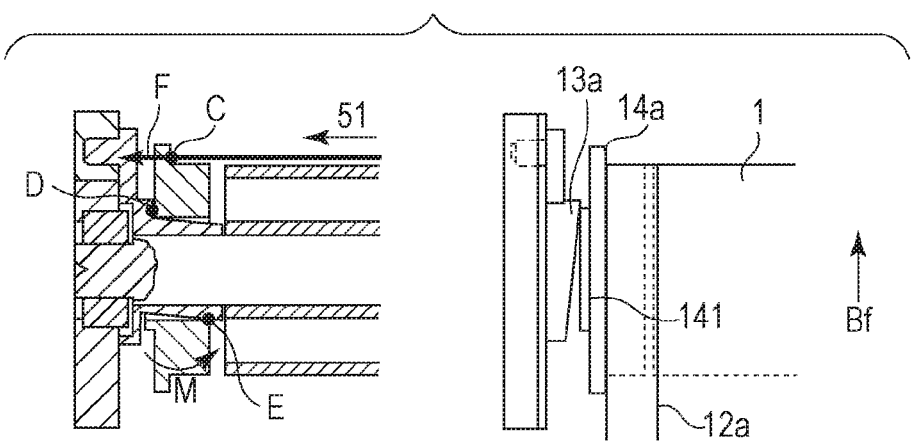
FIG. 19B is an enlarged view of the edge portion of the belt that presses the inclined flange roller.
Figure 19C:
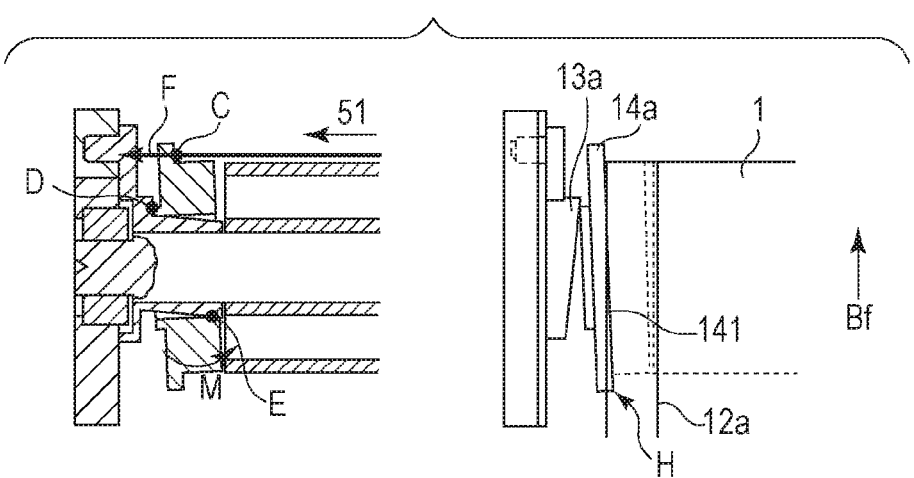
FIG. 19C illustrates the belt that further presses the inclined flange roller.

FIGS. 19A to 19C illustrate the belt 1 that is moved in the direction of the arrow 51 and is brought into contact with the inclined flange roller 14a. The inclined flange roller 14a is pressed by a force F of lateral shifting of the belt 1 and is brought into contact with the inclined shaft 13a at a point D. At that time, a rotational moment about the point D acting as the fulcrum is produced on the inclined flange roller 14a in the direction of an arrow M, where the point of effort is a point C. Thus, the inclined flange roller 14a starts to rotate.

FIG. 19B illustrates the belt 1 and the inclined flange roller 14a at the moment when the inclination angle of the inclined flange roller 14a reaches zero. At that time, a gap D formed between the edge surface of the belt 1 and the flange surface 141 in FIG. 19B disappears.

FIG. 19C illustrates the belt 1 and the inclined flange roller 14a after the inclined flange roller 14a further rotates. As illustrated in FIG. 19C, the flange surface 141 bites into the belt 1 upstream of the contact portion between the edge surface of the belt 1 and the flange surface 141. From this point, the belt 1 may run up onto the flange, or damage of the edge portion of the belt 1 may occur. In addition, if the force F of lateral shifting continues to be applied, scraping may occur at the points D and E due to the rotational moment in the direction of the arrow M, where the point of effect is the point E. Furthermore, the inclined flange roller 14a leans toward the side on which the flange surface 141 bites into the belt 1.

As described above, if the inclined flange roller 14a is brought into contact with the inclined shaft 13a at the point D, that is, a point inward of the point C at which the edge portion of the belt 1 is brought into contact with the inclined flange roller 14a (in the radial direction of the tension roller), the rotational moment is produced so that the inclination angle diminishes. As a result, the inclination angle of the inclined flange roller 14a is changed and, thus, it may be difficult to regulate the lateral shift of the edge portion of the belt 1 using the inclined flange roller 14a. That is, when the belt 1 is laterally shifted, the edge portion of the belt 1 may be brought into contact with the inclined flange roller 14a even in a portion in which buckling of the edge portion of the belt 1 and running up of the belt 1 onto the flange easily occur (a region outside the region in which the belt 1 is wound around the tension roller 4).

Figure 20:
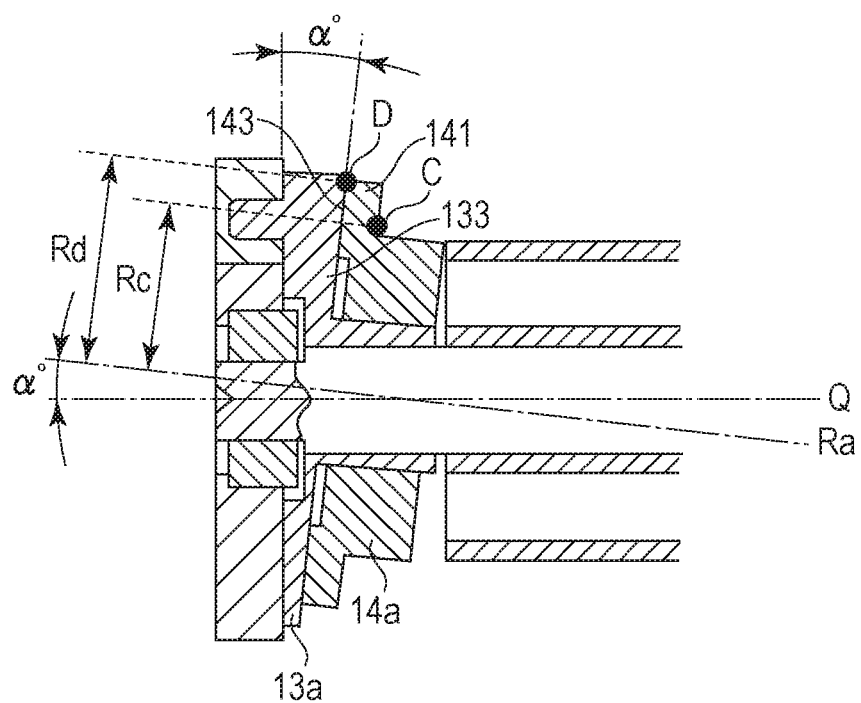
FIG. 20 is an enlarged view of a holding portion according to a fifth exemplary embodiment.

Therefore, the present exemplary embodiment is characterized in that the inclination angle of the inclined flange roller 14a is regulated. FIG. 20 illustrates the structure of the holding portion that regulates the inclination angle of the inclined flange roller 14a. As illustrated in FIG. 20, the inclined shaft 13a has an angle regulating surface 133 that serves as a contact surface with the inclined flange roller 14a and that serves as a regulation portion for regulating the inclination angle of the inclined flange roller 14a. The inclination angle is $\alpha°$ from a line perpendicular to the rotation axis Q of the tension roller 4. In addition, a flange contact surface 143 that is in contact with the angle regulating surface 133 is provided on the side adjacent to the inclined shaft 13a of the inclined flange roller 14a. An outermost edge point D of the flange contact surface 143 in the radial direction is located outward from a point C at which the belt 1 is in contact with the flange surface 141 to receive a force of lateral shifting in the radial direction. That is, let Rc be the distance from the rotation axis Ra of the inclined flange roller 14a to the point C, and let Rd be the distance from the rotation axis Ra to the point D. Then, Rd>Rc. At that time, the angle regulating surface 133 extends beyond the distance Rd so as to be in contact with the point D of the flange contact surface 143.

Figure 21A:
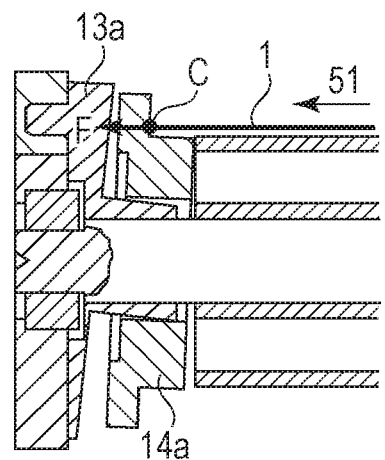
FIG. 21A is an enlarged view of the edge portion of the belt in contact with the inclined flange roller.
Figure 21B:
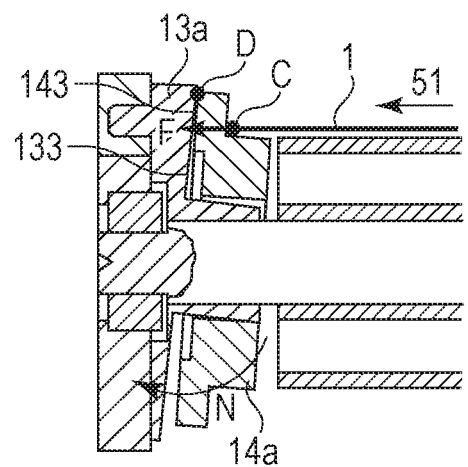
FIG. 21B is an enlarged view of the edge portion of the belt pressing the inclined flange roller.
Figure 21C:
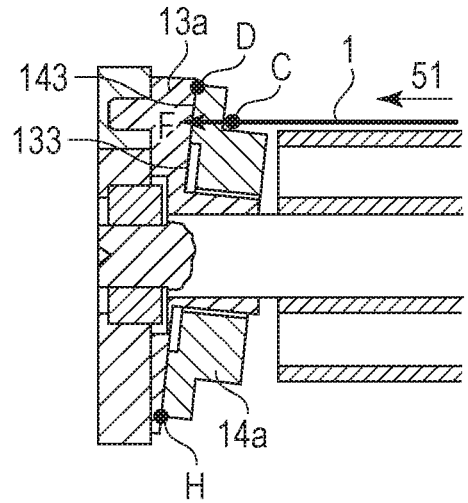
FIG. 21C is an enlarged view of the edge portion of the belt further pressing the inclined flange roller.

The movement of the inclined flange roller 14a when the inclined flange roller 14a receives the force of lateral shifting from the belt 1 is described next with reference to FIGS. 21A, 21B, and 21C. FIGS. 21A, 21B, and 21C are cross-sectional views of the holding portion.

FIG. 21A illustrates the inclined flange roller 14a located at a given position due to, for example, a gap between the inclined flange roller 14a and the inclined shaft 13a. At that time, the belt 1 moves in a direction of the arrow 51 and is brought into contact with the flange surface 141 at the point C. Thus, the inclined flange roller 14a is pressed in the direction of the arrow 51. As a result, as illustrated in FIG. 21B, the point D in the outermost edge portion of the flange contact surface 143 of the inclined flange roller 14a is brought into contact with the angle regulating surface 133 of the inclined shaft 13a. At that time, a rotational moment in a direction of an arrow N is produced about the fulcrum defined by the point D that contacts the angle regulating surface 133 first, where the point of effect is the point C at which the force F of lateral shifting is received. Thus, the inclined flange roller 14a rotates in the direction of the arrow N. According to the present exemplary embodiment, since the point D is located outward from the point C in the radial direction, the inclined flange roller 14a rotates in a direction opposite to the rotational direction of the rotational moment produced in the structure illustrated in FIGS. 19A to 19C, due to the positional relationship between the fulcrum and the point of effect.

As a result, as illustrated in FIG. 21C, the inclined flange roller 14a rotates in the direction of an arrow N and is brought into contact with the angle regulating surface 133 at a point H. Thus, the rotation of the inclined flange roller 14a is stopped. That is, the inclination angle of the inclined flange roller 14 is regulated by the angle regulating surface 133. In addition, since a rotational moment is not in effect, the contact region between the inclined flange roller 14 and the edge portion of the belt 1 can be maintained within a desired region (i.e., within the region in which the belt 1 is wound around the flange). By maintaining the inclination angle of the inclined flange roller 14 with a simplified structure, damage of the belt 1 can be prevented.

While the present exemplary embodiment has been described with reference to the belt 1 laterally shifted in the direction of the arrow 51, lateral shift of the belt 1 in the direction of an arrow 52 can be also regulated by the inclined flange roller 14b, since the inclined flange rollers 14 are provided at either end of the tension roller 4. Note that the inclined flange roller 14b is provided so as to be bilaterally symmetrical with respect to the inclined flange roller 14a and has a function similar to the inclined flange roller 14a.

While the present exemplary embodiment has been described with reference to the inclined shafts 13a and 13b each having the holding portion, a member other than the inclined shafts 13a and 13b may have the holding portion.

Figure 22A:
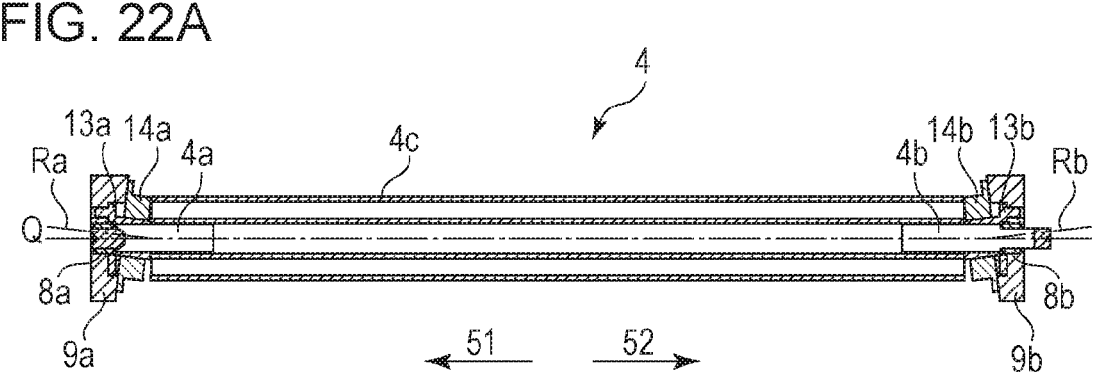
FIG. 22A is a cross-sectional view of another holding portion according to the fifth exemplary embodiment.
Figure 22B:
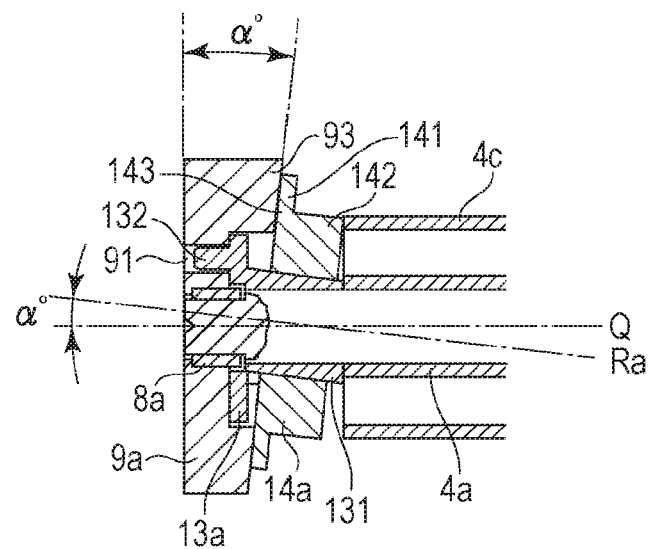
FIG. 22B is an enlarged view of the holding portion according to the fifth exemplary embodiment.
Figure 22C:
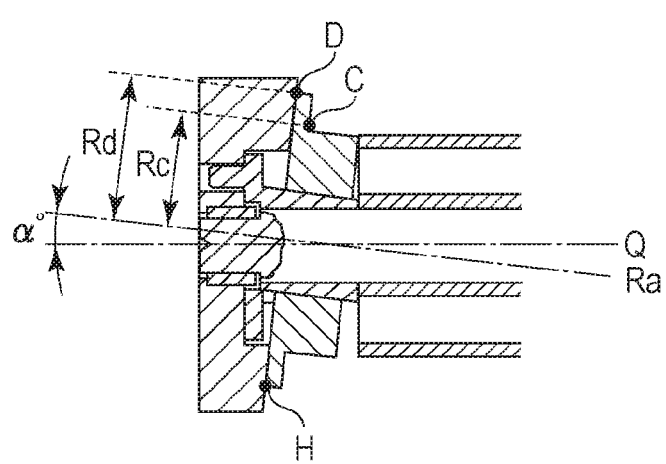
FIG. 22C is an enlarged view of the holding portion according to the fifth exemplary embodiment.

FIGS. 22A to 22C illustrate a structure in which the slider 9 serving as the holding member that supports the tension roller 4 via a bearing has a holding portion. FIG. 22A is a cross-sectional view of the tension roller 4. FIGS. 22B and 22C are enlarged views of the left end section of FIG. 22A. The tension roller 4 is supported by the bearings 8 located at both ends thereof. The tension roller 4 is rotatable about the rotation axis Q. At both ends of the three-arrow-shaped pipe 4c, the inclined shaft 13a having the shaft portion 131 inclined from the rotation axis Q of the tension roller 4 at an angle of $\alpha°$ in the direction of an arrow is disposed so that the boss portion 132 is fitted into the rotation stopper 91 of the sliders 9. Thus, the rotation of the inclined shaft 13a is stopped. The inclined flange roller 14a is fitted into the inclined shaft 13. Accordingly, the inclined flange roller 14 is rotatable about the rotation axis Ra which is different than the rotation axis Q of the tension roller 4.

In addition, the slider 9a has an angle regulating surface 93 serving as a holding portion that serves as a contact surface with the inclined flange roller 14a and that regulates the inclination angle of the inclined flange roller 14a. The inclination angle is $\alpha°$ from a line perpendicular to the rotation axis Q of the tension roller 4. In addition, a flange contact surface 143 that is in contact with the angle regulating surface 93 is provided on the surface of the inclined flange roller 14a adjacent to the sliders 9.

The outermost edge point D of the flange contact surface 143 in the radial direction is located outward from a point C at which the belt 1 is in contact with the flange surface 141 to receive a force of lateral shifting in the radial direction. That is, let Rc be the distance from the rotation axis Ra of the inclined flange roller 14a to the point C, and let Rd be the distance from the rotation axis Ra to the point D. Then, Rd>Rc. At that time, the angle regulating surface 93 extends beyond the distance Rd so as to be in contact with the point D of the flange contact surface 143. As a result, even when the inclined flange roller 14a receives the force of lateral shifting from the belt 1, the inclined flange roller 14a rotates about the point D as the fulcrum and is brought into contact with the angle regulating surface 93 of the sliders 9 at the point H. Thus, the inclination angle can be maintained.

Figure 23A:
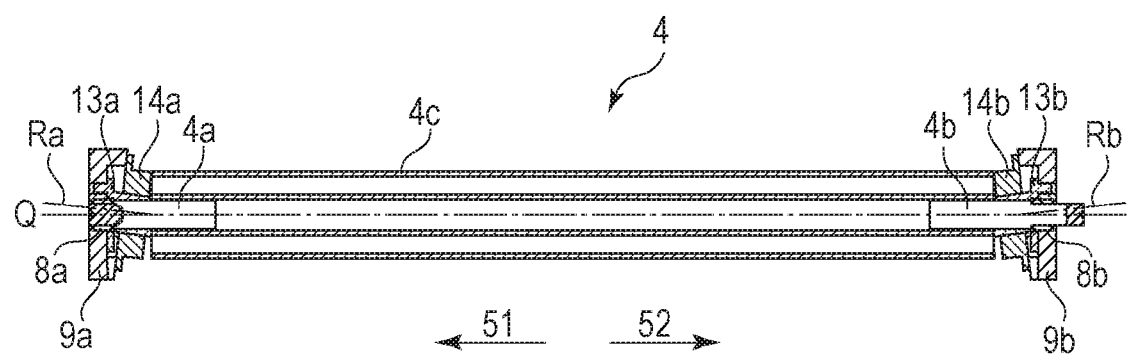
FIG. 23A is a cross-sectional view of a holding portion of a slider according to the fifth exemplary embodiment.
Figure 23B:
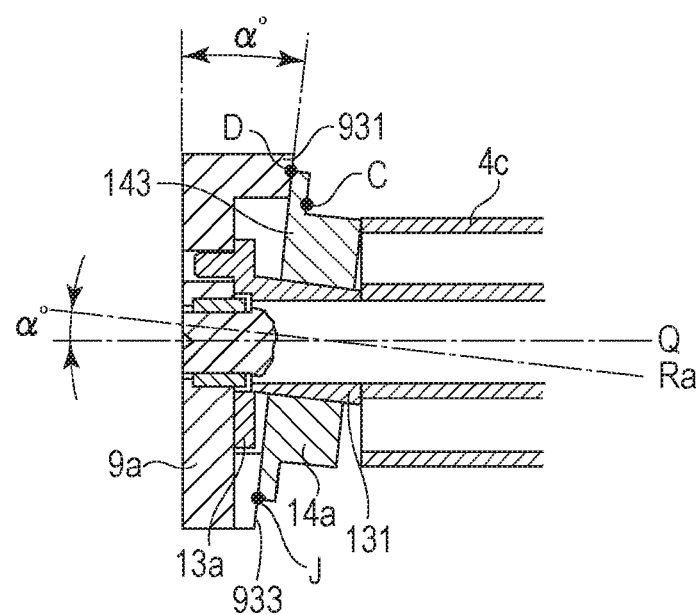
FIG. 23B is an enlarged view of the holding portion of the slider according to the fifth exemplary embodiment.
Figure 24:
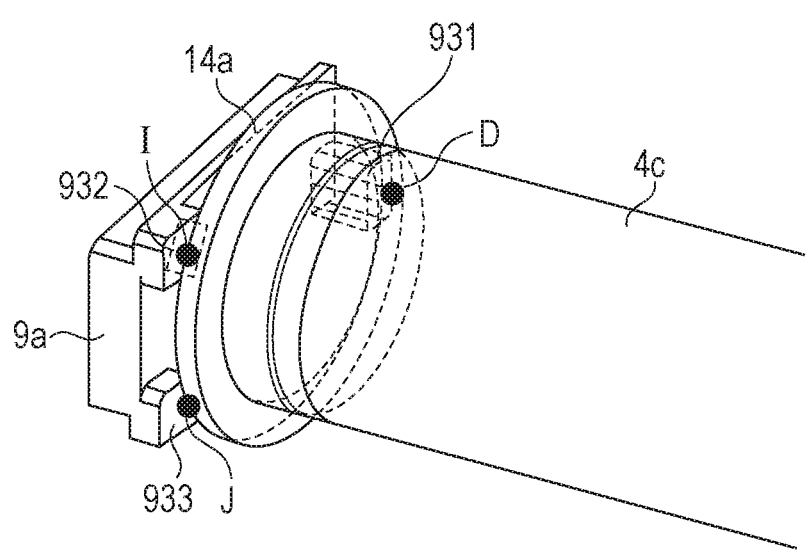
FIG. 24 is a perspective view of the holding portion of the slider according to the fifth exemplary embodiment.

As illustrated in FIGS. 23A and 23B and FIG. 24, the holding portion of the sliders 9 needs not be in contact with the flange contact surface 143 of the inclined flange roller 14 throughout the circumferential direction. FIG. 23A is a cross-sectional view of the tension roller 4 according to a modification of the present exemplary embodiment, and FIG. 23B is an enlarged view of the left end section of FIG. 23A. FIG. 24 is a perspective view of the left end section of FIG. 23B.

As illustrated in FIGS. 23A and 23B and FIG. 24, as a holding portion, angle regulating surfaces 931, 932, and 933 that are in contact with the inclined flange roller 14a are provided on the sliders 9 that supports the tension roller 4 via the bearings 8. When the inclined flange roller 14a receives the force of lateral shifting from the belt 1, a rotational moment about the point D acting as the fulcrum is produced, where the point C acts as the point of effect, as illustrated in FIG. 23B. Thereafter, as illustrated in FIG. 24, the flange contact surface 143 of the inclined flange roller 14a is brought into contact with points I and J that act as the points of load of the angle regulating surfaces 932 and 933. Thus, the inclination angle is regulated. At that time, the points I and J that act as the points of load are located on the opposite side of the axis of the inclined flange roller 14a from the point of effect. In this manner, even when, like the angle regulating surface 93 of FIGS. 23A and 23B, the flange contact surface 143 of the inclined flange roller 14 is not in contact with the angle regulating surface 93 throughout the circumferential direction, the inclination angle can be maintained if the flange contact surface 143 is in contact with at least three angle regulating surfaces 931, 932, and 933.

Other Exemplary Embodiments

While the above exemplary embodiments have been described with reference to the intermediate transfer unit serving as the belt conveyor unit, the present invention is not limited thereto. The belt of the belt conveyor unit may be a photoconductor belt on which an electrostatic latent image is formed, a transfer material conveyance belt that conveys a transfer material, or a fixing belt that fixes a toner image onto a transfer material. In addition, the belt conveyor unit according to the above-described exemplary embodiments may be employed for apparatuses other than an image forming apparatus, such as belt conveyors.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A belt conveyor unit comprising:
a movable endless belt;
a stretching roller configured to stretch the belt;
a bearing configured to support a stretching roller shaft of the stretching roller; and
a regulation member configured to regulate lateral shift of the belt in a case the belt is shifted to one side in a belt width direction that is perpendicular to a belt moving direction,
wherein the regulation member is fixed in a non-rotatable state in relation to the stretching roller shaft, and is disposed outward of an end portion of the stretching roller in the belt width direction,
wherein the regulation member includes a first regulation portion opposing an edge portion of the belt with respect to a width direction of the belt and a second regulation portion capable of being in contact with an inner peripheral surface of the belt between the first regulation portion and the end portion of the stretching roller in the belt width direction,
wherein the first regulation portion includes
a first surface contactable to the edge portion of the belt corresponding to a first region of the belt wound around the stretching roller; and
a second surface that is provided at a position retracted from the edge portion of the belt in comparison with the first surface in the belt width direction and is not in contact with the edge portion of the belt corresponding to a second region of the belt not wound around the stretching roller.

2. The belt conveyor unit according to claim 1, further comprising:
a pressing member configured to press the stretching roller,
wherein the stretching roller is formed as a tension roller that press the belt in a direction from the inner peripheral surface to an outer peripheral surface of the belt.

3. The belt conveyor unit according to claim 1,
wherein the regulation member is fitted into the stretching roller shaft, and the rotation of the regulation member is stopped by a boss.

4. The belt conveyor unit according to claim 1,
wherein the first surface and the second surface are integrally formed so as to be seamlessly connected to each other, and a retraction surface is provided between the first surface and the second surface in a belt moving direction in a retracted manner in comparison with the first surface so as not to be in contact with the first region of the belt in the belt width direction.

5. The belt conveyor unit according to claim 2,
wherein the second regulation portion is located inward of a surface of the tension roller that is in contact with the inner peripheral surface of the belt in a pressing direction of the pressing member.

6. The belt conveyor unit according to claim 1,
wherein the belt has reinforcement tapes bonded onto the outer peripheral surfaces of both edge portions in the belt width direction.

7. An image forming apparatus comprising:
a plurality of image bearing members configured to bear toner images of different colors;
a movable endless belt configured to transfer the toner images from the image bearing members to a transfer material;

a stretching roller configured to stretch the belt;
a bearing configured to support a stretching roller shaft of the stretching roller; and
a regulation member configured to regulate lateral shift of the belt if the belt is shifted to one side in a belt width direction that is perpendicular to a belt moving direction,
wherein the regulation member is fixed in a non-rotatable state in relation to the stretching roller shaft, and is disposed outward of an end portion of the stretching roller in the belt width direction,
wherein the regulation member includes a first regulation portion opposing an edge portion of the belt with respect to a width direction of the belt and a second regulation portion capable of being in contact with an inner peripheral surface of the belt between the first regulation portion and the end portion of the stretching roller in the belt width direction,
wherein the first regulation portion includes
a first surface contactable to the edge portion of the belt corresponding to a first region of the belt wound around the stretching roller; and
a second surface that is provided at a position retracted from the edge portion of the belt in comparison with the first surface in the belt width direction and is not in contact with the edge portion of the belt corresponding to a second region of the belt not wound around the stretching roller.

8. The image forming apparatus according to claim 7, further comprising:
a pressing member configured to press the stretching roller,
wherein the stretching roller is formed as a tension roller that press the belt in a direction from the inner peripheral surface to an outer peripheral surface of the belt.

9. The image forming apparatus according to claim 7, further comprising:
wherein the regulation member is fitted into the stretching roller shaft, and the rotation of the regulation member is stopped by a boss.

10. The image forming apparatus according to claim 7,
wherein the first surface and the second surface are integrally formed so as to be seamlessly connected to each other, and a retraction surface is provided between the first surface and the second surface in a belt moving direction in a retracted manner in comparison with the first surface so as not to be in contact with the first region of the belt in the belt width direction.

11. The image forming apparatus according to claim 8,
wherein the second regulation portion is located inward of a surface of the tension roller that is in contact with the inner peripheral surface of the belt in a pressing direction of the pressing member.

12. A belt conveyor unit comprising:
a movable endless belt;
a stretching roller configured to stretch the belt;
a bearing configured to support a stretching roller shaft of the stretching roller; and
a regulation member configured to regulate lateral shift of the belt in a case the belt is shifted to one side in a belt width direction that is perpendicular to a belt moving direction,
wherein the regulation member is fixed in a non-rotatable state in relation to the stretching roller shaft, and is disposed outward of an end portion of the stretching roller in the belt width direction,
wherein the regulation member includes a first regulation portion opposing an edge portion of the belt with respect to a width direction of the belt and a second regulation portion capable of being in contact with an inner peripheral surface of the belt between the first regulation portion and the end portion of the stretching roller in the belt width direction, and
wherein the first regulation portion includes
a first surface contactable to the edge portion of the belt corresponding to a first region of the belt wound around the stretching roller; and
a second surface not in contact with the edge portion of the belt corresponding to the first region.

13. The belt conveyor unit according to claim 12,
wherein each of the first surface and the second surface is a common surface that faces the edge portion of the belt.

14. The belt conveyor unit according to claim 12, further comprising:
a pressing member configured to press the stretching roller,
wherein the stretching roller is formed as a tension roller that press the belt in a direction from the inner peripheral surface to an outer peripheral surface of the belt.

15. The belt conveyor unit according to claim 12,
wherein the regulation member is fitted into the stretching roller shaft, and the rotation of the regulation member is stopped by a boss.

16. The belt conveyor unit according to claim 14,
wherein the second regulation portion is located inward of a surface of the tension roller that is in contact with the inner peripheral surface of the belt in a pressing direction of the pressing member.

17. The belt conveyor unit according to claim 12,
wherein the belt has reinforcement tapes bonded onto the outer peripheral surfaces of both edge portions in the belt width direction.

18. An image forming apparatus comprising:
a plurality of image bearing members configured to bear toner images of different colors;
a movable endless belt configured to transfer the toner images from the image bearing members to a transfer material;
a stretching roller configured to stretch the belt;
a bearing configured to support a stretching roller shaft of the stretching roller; and
a regulation member configured to regulate lateral shift of the belt if the belt is shifted to one side in a belt width direction that is perpendicular to a belt moving direction,
wherein the regulation member is fixed in a non-rotatable state in relation to the stretching roller shaft, and is disposed outward of an end portion of the stretching roller in the belt width direction,
wherein the regulation member includes a first regulation portion opposing an edge portion of the belt with respect to a width direction of the belt and a second regulation portion capable of being in contact with an inner peripheral surface of the belt between the first regulation portion and the end portion of the stretching roller in the belt width direction,
wherein the first regulation portion includes
a first surface contactable to the edge portion of the belt corresponding to a first region of the belt wound around the stretching roller; and
a second surface not in contact with the edge portion of the belt corresponding to the first region.

19. The image forming apparatus according to claim 18, further comprising:
- a pressing member configured to press the stretching roller,
- wherein the stretching roller is formed as a tension roller that press the belt in a direction from the inner peripheral surface to an outer peripheral surface of the belt.

20. The belt conveyor unit according to claim 18,
- wherein the regulation member is fitted into the stretching roller shaft, and the rotation of the regulation member is stopped by a boss.

21. The belt conveyor unit according to claim 19,
- wherein the second regulation portion is located inward of a surface of the tension roller that is in contact with the inner peripheral surface of the belt in a pressing direction of the pressing member.

* * * * *